(12) United States Patent
Koda et al.

(10) Patent No.: US 6,410,650 B1
(45) Date of Patent: Jun. 25, 2002

(54) ETHYLENE/α-OLEFIN/UNCONJUGATED POLYENE COPOLYMER RUBBER, RUBBER COMPOSITION FOR SEALING, MOLDED RUBBER FOR SEALING, AND PROCESS FOR PRODUCING THE MOLDED RUBBER

(75) Inventors: Taku Koda; Masaaki Kawasaki, both of Chiba (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/701,304

(22) PCT Filed: Mar. 29, 2000

(86) PCT No.: PCT/JP00/01967

§ 371 (c)(1),
(2), (4) Date: Nov. 28, 2000

(87) PCT Pub. No.: WO00/59962

PCT Pub. Date: Oct. 12, 2000

(30) Foreign Application Priority Data

Apr. 2, 1999 (JP) .............................. 11-96475

(51) Int. Cl.$^7$ .................. C08F 210/18; C08F 8/34; C08L 23/08; C08L 23/16; C09K 3/10
(52) U.S. Cl. .............. 525/191; 525/210; 525/213; 525/232; 525/240
(58) Field of Search ............................. 525/191, 210, 525/213, 232, 240

(56) References Cited

U.S. PATENT DOCUMENTS

| 4,510,303 A | 4/1985 | Oda et al. .............. 526/282 |
|---|---|---|
| 4,722,971 A | 2/1988 | Datta et al. ............ 525/211 |
| 5,242,971 A | 9/1993 | Nakahama et al. ...... 524/526 |
| 5,610,254 A | 3/1997 | Sagane et al. .......... 526/282 |

FOREIGN PATENT DOCUMENTS

| EP | 94051 | 11/1983 |
| EP | 227206 | 7/1987 |
| EP | 446382 | 9/1991 |
| EP | 718323 | 6/1996 |
| JP | 8337693 | 12/1996 |
| JP | 9169878 | 6/1997 |

*Primary Examiner*—Nathan M. Nutter
(74) *Attorney, Agent, or Firm*—Sherman & Shalloway

(57) ABSTRACT

The present invention relates to an ethylene-α-olefin-non-conjugated polyene copolymer rubber comprising ethylene, an α-olefin having 3 to 20 carbon atoms and a non-conjugated polyene, characterized in that:

(i) the intrinsic viscosity [η] as measured in decalin solvent at 135° C. is 1.5 to 5.0 dl/g;
(ii) the gη* or g' value is 0.6 to 0.9;
(iii) the Mw/Mn is 3.0 to 50;
(iv) the iodine value is 10 to 40;
(v) the molar ratio of ethylene to the α-olefin having 3 to 20 carbon atoms is 40/60 to 95/5; and
(vi) the intensity ratio D of Tαβ to Tαα in $^{13}$C-NMR spectrum (Tαβ/Tαα) is 0.5 or less, as well as to a rubber composition for sealing using said copolymer rubber, a molded rubber part for sealing, and a process for preparing said molded part.

9 Claims, No Drawings

ETHYLENE/α-OLEFIN/UNCONJUGATED POLYENE COPOLYMER RUBBER, RUBBER COMPOSITION FOR SEALING, MOLDED RUBBER FOR SEALING, AND PROCESS FOR PRODUCING THE MOLDED RUBBER

TECHNICAL FIELD

The present invention relates to an ethylene-α-olefin-non-conjugated polyene copolymer rubber, a rubber composition for sealing, a molded part for sealing and a process for producing the molded part. More particularly, it relates to techniques capable of providing a cross-linked, molded rubber part for sealing which is excellent in sealing performance as well as rolling processability, shape retention, mechanical strength properties, heat resistance, cold or low temperature resistance and compression set resistance.

BACKGROUND ART

Many sealing materials for use in automobiles and buildings comprise ethylene-propylene copolymer rubber (EPR) and ethylene-propylene-diene copolymer rubber (EPDM), which are excellent in heat resistance, weather resistance, processability and cost. EPR and EPDM have been very widely spread, especially as materials indispensable for automobile door, trunk and window seals.

As the performance has become higher and higher and the life has become longer and longer in automobiles, higher and higher performance has been required for these sealing materials. However, it has become difficult to fully satisfy all the requisite performance by conventional techniques.

Sealing performance may be affected by many factors, such as the cross-sectional shape, compression set resistance and flexibility of a sealing rubber. For example, the cross-sectional shape of a current sealing rubber has become more complex than conventional ones; lip portions thereof have become thinner and longer. Further, sealing materials to be mounted on hard-top components are now required to be larger in their cross-sectional shape and thinner in their thickness than conventional ones. Thus, a problem of "shape collapse" has been caused in the vulcanizing or foaming step in a process for preparing sealing materials; i.e., a correct cross-sectional shape cannot be obtained.

"Shape retention" is generally used as an index for the shape collapse. There is a need for sponge rubbers having good shape retention. Attempts to use two or more polyene components for the purpose of improving the shape retention of EPDM, such as ethylene-propylene-5-ethylidene-2-norbornene copolymer (EPT), have been made relatively long (see, for example, Japanese Patent Publication Nos. 44-7713 and 47-23914 and Japanese Patent Application Laying Open Nos. 49-62582, 49-62583, 56-22338 and 58-191705), but have not achieved all the aforementioned desirable performance.

For instance, in the method using the combination of 5-ethylidene-2-norbornene (ENB) and dicyclopentadiene (DCPD) as the polyene in EPDM, any of extrusion processability, vulcanizing rate and mechanical strength of vulcanized rubber does not exhibit a satisfactory value depending upon the balance between the contents of ENB and DCPD. Further, the method using both ENB and vinylnorbornene (VNB) as the polyene in EPDM is still not sufficient and is poor in manufacturing cost, though the balance between the extrusion processability, vulcanizing rate and mechanical strength of vulcanized rubber is slightly improved. Thus, no satisfactory EPDM has been obtained.

A method for providing excellent sealing performance, shape retention and sponge rubber properties by using a metallocene catalyst was found (Japanese Patent Application Laying Open No. 9-3269) but did not provide satisfactory rolling processability.

Thus, according to the aforementioned methods, no EPDM has been obtained that is capable of providing a cross-linked, molded rubber part for sealing which is excellent in sealing performance as well as rolling processability, shape retention, mechanical strength properties, heat resistance, cold resistance and compression set resistance.

Accordingly, there is a great need for a cross-linked, molded rubber part for sealing which is excellent in sealing performance as well as rolling processability, shape retention, mechanical strength properties, heat resistance, cold resistance and compression set resistance, and a process for producing the same.

DISCLOSURE OF THE INVENTION

The present invention is to solve the above mentioned problems associated with the prior art and has an object of providing an ethylene-α-olefin-non-conjugated polyene copolymer rubber capable of providing a cross-linked, molded rubber part for sealing which is excellent in sealing performance as well as rolling processability, shape retention, mechanical strength properties, heat resistance, cold resistance and compression set resistance, as well as a rubber composition for sealing using said copolymer rubber, a molded part for sealing, and a process for producing the molded part.

In a first aspect, the present invention is an ethylene-α-olefin-non-conjugated polyene copolymer rubber comprising ethylene, an α-olefin having 3 to 20 carbon atoms and a non-conjugated polyene, characterized in that:

(i) the intrinsic viscosity $[\eta]$ as measured in decalin solvent at 135° C. is 1.5 to 5.0 dl/g;

(ii) the $g\eta^*$ or g' value is 0.6 to 0.9, wherein the $g\eta^*$ value is defined as a ratio of the intrinsic viscosity $[\eta]$ as measured in (i) above to an intrinsic viscosity $[\eta]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity $[\eta]$ ($[\eta]/[\eta]_{blank}$), and the g' value is defined as a ratio of the intrinsic viscosity $[\eta]$ as measured in (i) above to an intrinsic viscosity $[\eta]_{blank}'$ as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=$[\eta]/[\eta]_{blank}'$);

(iii) the Mw/Mn is 3.0 to 50;

(iv) the iodine value is 10 to 40;

(v) the molar ratio of ethylene to the α-olefin having 3 to 20 carbon atoms is 40/60 to 95/5; and (vi) the intensity ratio D of $T\alpha\beta$ to $T\alpha\alpha$ in $^{13}$C-NMR spectrum ($T\alpha\beta/T\alpha\alpha$) is 0.5 or less.

The copolymer rubber of the first invention is not particularly limited as long as it has the aforementioned properties as a whole, and may be obtained by a one step polymerization reaction or may be any composition comprising copolymer rubbers having different properties.

In a second aspect, the present invention is an ethylene-α-olefin-non-conjugated polyene copolymer rubber comprising ethylene, an α-olefin having 3 to 20 carbon atoms and a non-conjugated polyene, which comprises:

(A) an ethylene-α-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη$^‡$ or g' value is 0.8 to 0.98, wherein the gη$^‡$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$') ; and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη$^‡$ or g' value is 0.4 to 0.9, wherein the gη value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), said copolymer rubber (A) and said copolymer rubber (B) being present in a weight ratio of 75/25 to 5/95.

Preferably, the copolymer rubber of the second invention has an intrinsic viscosity [η] as measured in decalin solvent at 135° C. of 1.5 to 5.0 dl/g, an iodine value of 10 to 40, and a gη$^‡$ or g' value of 0.6 to 0.9, wherein the gη$^‡$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$) and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$').

In a third aspect, the present invention is a rubber composition for sealing, comprising an ethylene-α-olefin-non-conjugated polyene copolymer rubber of the first or second invention.

In a fourth aspect, the present invention is a molded rubber part for sealing, comprising a vulcanized or cured ethylene-α-olefin-non-conjugated polyene copolymer rubber of the first or second invention.

In a fifth aspect, the present invention is a molded rubber part for sealing, comprising a vulcanized or cured rubber composition for sealing of the third invention.

The molded rubber part for sealing of the fourth and fifth invention may include, for example, a cross-linked, molded rubber part for sealing comprising a rubber composition of an ethylene-α-olefin-non-conjugated polyene copolymer rubber which comprises ethylene, an α-olefin having 3 to 20 carbon atoms and a non-conjugated polyene, said ethylene-α-olefin-non-conjugated polyene copolymer rubber being obtained by random copolymerizing, in the presence of a catalyst, ethylene, an α-olefin having 3 to 20 carbon atoms, and a non-conjugated polyene having only one carbon-carbon double bond polymerizable by said catalyst per molecule among carbon-carbon double bonds present therein, said ethylene-α-olefin-non-conjugated polyene copolymer rubber being a blend of (A) an ethylene-a-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη$^‡$ or g' value is 0.8 to 0.98, wherein the gη$^‡$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$) and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη$^‡$ or g' value is 0.4 to 0.9, wherein the gη$^‡$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), said copolymer rubber (A) and said copolymer rubber (B) being present in a weight ratio of 75/25 to 5/95, and, after blending, the intrinsic viscosity [η] as measured in decalin solvent at 135° C. is 1.5 to 5.0 dl/g, the iodine value is 10 to 40; and the ratio gη‡, ($[η]/[η]_{blank}$), of the intrinsic viscosity [η] as measured in the above to an intrinsic viscosity $[η]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η], is 0.6 to 0.9.

The molded rubber part for sealing according to the present invention may be prepared by vulcanizing or curing, for example, a rubber composition comprising an ethylene-α-olefin-non-conjugated polyene copolymer rubber which is obtained by random copolymerizing, in the presence of a catalyst, ethylene, an α-olefin having 3 to 20 carbon atoms, and a non-conjugated polyene having only one carbon-carbon double bond polymerizable by said catalyst per molecule among carbon-carbon double bonds present therein, said ethylene-α-olefin-non-conjugated polyene copolymer rubber being a blend of (A) an ethylene-α-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη‡ or g' value is 0.8 to 0.98, wherein the gη‡ value is defined as a ratio of the intrinsic viscosity [η] as measured in the above to an intrinsic viscosity $[η]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ($[η]/[η]_{blank}$), and the g' value is defined as a ratio of the intrinsic viscosity [η] as measured in the above to an intrinsic viscosity $[η]_{blank}'$ as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer ($g'=[η]/[η]_{blank}'$), and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη‡ or g' value is 0.4 to 0.9, wherein the gη‡ value is defined as a ratio of the intrinsic viscosity [η] as measured in the above to an intrinsic viscosity $[η]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ( $[η]/[η]_{blank}$) and the g' value is defined as a ratio of the intrinsic viscosity [η] as measured in the above to an intrinsic viscosity $[η]_{blank}'$ as reduced to a linear ethylene-propylene copolymer having an ethylene content of 70% by mole, which is determined by gel permeation chromatography (140° C. o-dichlorobenzene solvent) of the ethylene-α-olefin-non-conjugated polyene copolymer ($g'=[η]/[η]_{blank}'$), said copolymer rubber (A) and said copolymer rubber (B) being present in a weight ratio of 75/25 to 5/95, and wherein, after blending, the intrinsic viscosity [η] as measured in decalin solvent at 135° C. is 1.5 to 5.0 dl/g, the iodine value is 10 to 40; and the gη‡ or g' value is 0.6 to 0.9, wherein the gη‡ value is defined as a ratio of the intrinsic viscosity [η] as measured in the above to an intrinsic viscosity $[η]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ($[η]/[η]_{blank}$), and the g' value is defined as a ratio of the intrinsic viscosity [η] as measured in the above to an intrinsic viscosity $[η]_{blank}'$ as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer ($g'=[η]/[η]_{blank}'$).

Hereinafter, the present invention will be described in detail.

The ethylene-α-olefin-non-conjugated polyene copolymer rubber in the present invention may be obtained by copolymerizing, preferably randomly, in the presence of a catalyst, preferably a metallocene catalyst, ethylene, an α-olefin having 3 to 20 carbon atoms, and a non-conjugated polyene having only one carbon-carbon double bond polymerizable with said catalyst per molecule among carbon-carbon double bonds present therein (hereinafter sometimes referred to simply as "non-conjugated polyene").

The (α-olefin having 3 to 20 carbon atoms may include, for example, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 3-ethyl-1-pentene, 4-methyl-1-penetene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and any combinations thereof. Among these, α-olefins having 3 to 10 carbon atoms are preferred, and especially preferred are propylene, 1-butene, 1-hexene, 1-octene, etc.

The non-conjugated polyene is a non-conjugated polyene having only one carbon-carbon double bond polymerizable with a catalyst used, preferably a metallocene catalyst, per molecule among carbon-carbon double bonds present therein. Such a non-conjugated polyene does not include any linear polyene having vinyl groups at both ends thereof. If two or more vinyl groups are present and one of them is a terminal vinyl group, the other vinyl group preferably is present not at the terminal but in the internal of the olefin structure. Such polyenes include aliphatic and alicyclic polyenes.

The aliphatic polyenes may include 1,4-hexadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4- decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, etc.

The alicyclic polyenes are preferably polyenes composed of an alicyclic moiety having one unsaturated bond and a linear moiety having an internal olefin bond, and may include, for example, dienes, such as 5-ethylidene-2-norbornene, 5-isopropylidene-2-norbornene and 6-chloromethyl-5-isopropylidene-2-norbornene; trienes, such as 2,3-diisopropylidene-5-norbornene and 2-ethylidene-3-isopropylidene-5-norbornene; etc. Among these non-conjugated polyenes, 5-ethylidene-2-norbornene and 1,4-hexadiene are particularly preferred.

These non-conjugated polyenes may be used alone or in any combinations of two or more thereof.

The copolymer rubber of the first invention has the following properties:

(i) Intrinsic Viscosity [η]

The intrinsic viscosity [η] as measured in decalin solvent at 135° C. is 1.5 to 5.0 dl/g, preferably 2.0 to 4.0 dl/g.

(ii) $g\eta^{\ddagger}$ or g' Value:

The $g\eta^{\ddagger}$ value is defined as a ratio $([\eta]/[\eta]_{blank})$ of the intrinsic viscosity [η] as measured in (i) above to an intrinsic viscosity $[\eta]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η]. The $g\eta^{\ddagger}$ value may be determined by the method described in Japanese Patent Publication No. H3-14045.

The g' value is defined as a ratio $(g'=[\eta]/[\eta]_{blank}')$ of the intrinsic viscosity [η] as measured in (i) above to an intrinsic viscosity $[\eta]_{blank}'$ as reduced to a linear ethylene-propylene copolymer (EPR) having an ethylene content of 70% by mole, which is determined by gel permeation chromatography (GPC, 140° C., o-dichlorobenzene solvent) of the ethylene-α-olefin-non-conjugated polyene copolymer.

The g' value may be determined by the method described in Japanese Patent Application Laying Open No. 9-71618. Thus, the ethylene-α-olefin-non-conjugated polyene copolymer rubber is subjected to GPC measurement to obtain polystyrene reduced molecular weights $M_{i-PSt}$ of respective fractions. Then, these $M_{i-PSt}$ values are converted into EPR reduced molecular weights $M_{i-EPR}$ using the following equations:

$$[\eta]_{i-PSt} \cdot M_{i-PSt} = [\eta]_{i-EPR} \cdot M_{i-EPR};$$

and $$[\eta]_{i-PSt}=1.37\times10^{-4}M_{i-PSt}^{0.686}; \quad [\eta]_{i-EPR}=7.2\times10^{-4}M_{i-EPR}^{0.667}.$$

The converted $M_{i-EPR}$ values are converted into $[\eta]_{i-blank}'$ values for respective fractions according to the following equation (II):

$$[\eta]_{i-blank}'=7.2\times10^{-4}M_{i-EPR}^{0.667} \tag{II}$$

wherein the subscript i represents each fraction fractionated by GPC. Then, the converted $[\eta]_{i-blank}'$ values are used to calculate $[\eta]_{blank}'$ according to the following equation (III):

$$[\eta]_{blank}'=\Sigma\omega_i\cdot[\eta]_{i-blank}'/\Sigma\omega_i \tag{III}$$

wherein ω represents the weight fraction. In this manner, $[\eta]_{blank}'$ is calculated and then g' is determined by the ratio of [η] thereto.

The $g\eta^{\ddagger}$ or g' value of the copolymer rubber according to the first invention is 0.6 to 0.9, preferably 0.7 to 0.9.

(iii) Weight Average Molecular Weight (According to Light Scattering Method) Mw/number Average Molecular Weight Mn Mw/Mn is 3.0 to 50, preferably 3.5 to 40. Mw/Mn may be determined by gel permeation chromatography (GPC) using GMH-HT and GMH-HTL manufactured by Tosoh Corp. as the column and o-dichlorobenzene as the solvent.

(iv) Iodine Value

The iodine value is 10 to 40, preferably 12 to 38.

(v) Ethylene/α-olefin Component Ratio

The copolymer rubber of the first invention comprises (a) units derived from ethylene and (b) units derived from the α-olefin having 3 to 20 carbon atoms (hereinafter sometimes referred to simply as "α-olefin") in a molar ratio [(a)/(b)] of 40/60 to 95/5, preferably 50/50 to 90/10.

(vi) D Value

The intensity (area) ratio D (Tαβ/Tαα) of Tαβ to Tαα in $^{13}$C-NMR spectrum of the copolymer rubber of the first invention is 0.5 or less, preferably 0.3 or less.

The intensity ratio D value depends upon the kind of the α-olefin constituting the random copolymer rubber.

The Tαβ and Tαα in $^{13}$C-NMR spectrum represent respective peak intensities of two different $CH_2$'s at different positions relative to the tertiary carbon atom in the units derived from the α-olefin, as shown in the following formulae:

$$\underset{\text{T}\alpha\beta}{\overset{\overset{R}{|}\quad\quad\overset{R}{|}}{-\underset{|}{\overset{}{C}}-CH_2-CH_2-\underset{|}{\overset{}{C}}-}} \quad \underset{\text{T}\alpha\alpha}{\overset{\overset{R}{|}\quad\quad\overset{R}{|}}{-CH_2-\underset{|}{\overset{}{C}}-CH_2-\underset{|}{\overset{}{C}}-}}$$

The intensity ratio D of a random copolymer rubber may be determined in the following manner:

$^{13}$C-NMR spectrum of a random copolymer rubber is measured at 67.8 MHz using $d_6$-benzene (128 ppm) standard and a NMR apparatus, such as JEOL-GX270 (JEOL Ltd.), in a mixed solution comprising 5% by weight of a sample in hexachlorobutadiene/$d_6$-benzene (2/1, by volume) at 25° C.

The $^{13}$C-NMR spectrum was analyzed substantially according to the proposal by Lindemann Adams (Analysis Chemistry, 43, p. 1245 (1971)) and J. C. Randall (Review Macromolecular Chemistry Physics, C29, 201 (1989)).

The intensity ratio D is now described in more detail with respect to ethylene-1-butene-7-methyl-1,6-octadiene copolymer rubber as an example.

In the $^{13}$C-NMR spectrum of the ethylene-1-butene-7-methyl-1,6-octadiene copolymer rubber, the peaks appearing at 39 to 40 ppm and 31 to 32 ppm are attributed to Tαα and Tαβ, respectively.

The intensity ratio D is calculated from a ratio of integrated values (areas) of respective peak portions.

An intensity ratio D obtained in this manner has generally been considered to be a measure for indicating the possibility or percentage of 2,1-addition reaction occurring following 1,2-addition of 1-butene, or the possibility or percentage of 1,2-addition reaction occurring following 2,1-addition of 1-butene. Therefore, the higher the intensity ratio D value, the more irregular the orientation of linkage of the α-olefin (1-butene). On the contrary, the lower the D value, the more regular the linkage orientation of the α-olefin. Such higher regularity is preferable since molecular chains tend to readily aggregate resulting in better properties, such as strength, of the random copolymer rubber.

In the present invention, ethylene, an α-olefin and a non-conjugated polyene are copolymerized by using a particular Group 4 (titanium group) metallocene catalyst to yield a random copolymer rubber having the intensity ratio D of 0.5 or less, as described below. For example, however, if ethylene, 1-butene and 7-methyl-1,6-octadiene are copolymerized in the presence of a Group 5 (e.g., vanadium) metallocene catalyst, no ethylene-1-butene-7-methyl-1,6-octadiene copolymer rubber having the aforementioned intensity ratio D of 0.5 or less can be obtained. This is true in other α-olefins than 1-butene as well.

Preferably, the copolymer rubber of the first invention has a B value of 1.0 to 1.5, wherein the B value is determined by $^{13}$C-NMR spectrum and the following equation:

$$B \text{ value} = [P_{OE}]/(2 \cdot [P_E] \cdot [P_o])$$

wherein $[P_E]$ is a molar fraction of the content of units (a) derived from ethylene in the random copolymer rubber, $[P_o]$ is a molar fraction of the content of units (b) derived from the α-olefin in the random copolymer rubber, and $[P_{OE}]$ is a rate or percentage of the number of α-olefin-ethylene chains relative to the number of total dyad chains in the random copolymer rubber.

This B value is an indication of distribution of ethylene and α-olefin in a copolymer rubber and may be determined based on the report by J. C. Randall (Macromolecules, 15, 353 (1982)) and J. Ray (Macromolecules, 10, 773 (1977)).

The higher the B value, the shorter the block chain of ethylene or α-olefin, which indicates that the distribution of ethylene and α-olefin is uniform and that the compositional distribution of the copolymer rubber is narrow. If the B value is lower than 1.0, the compositional distribution of the copolymer rubber will be broader and such a copolymer rubber may not exhibit sufficiently properties, such as strength, for example when cross-linked as compared with copolymer rubbers having a narrower compositional distribution.

In the present invention, ethylene, an α-olefin and a non-conjugated polyene are copolymerized by using a particular Group 4 (titanium group) metallocene catalyst to yield a random copolymer rubber having the B value of 1.0 to 1.5, as described below. For example, however, if ethylene, an α-olefin and a non-conjugated polyene are copolymerized in the presence of, e.g., a titanium non-metallocene catalyst, no ethylene-α-olefin-non-conjugated polyene copolymer rubber having the aforementioned B value can be obtained.

The copolymer rubber of the second invention is a composition containing the ethylene-α-olefin-non-conjugated polyene copolymer rubber (A) having the below mentioned properties (hereinafter referred to as "copolymer rubber (A)") and the ethylene-α-olefin-non-conjugated polyene copolymer rubber (B) having the below mentioned properties (hereinafter referred to as "copolymer rubber (B)") and may be prepared, for example, by blending the copolymer rubber (A) and the copolymer rubber (B).

The copolymer rubber (A) has the following properties:
(1) Ethylene/α-olefin Component Ratio The copolymer rubber (A) comprises (a) units derived from ethylene and (b) units derived from the c(-olefin having 3 to 20 carbon atoms (hereinafter sometimes referred to simply as "α-olefin") in a molar ratio [(a)/(b)] of 40/60 to 75/25, preferably 55/45 to 70/30.

(2) Iodine Value

The iodine value of the copolymer rubber (A) is 15 to 50, preferably 15 to 40. Ethylene-α-olefin-non-conjugated polyene copolymer rubbers having such an iodine value show a higher vulcanizing rate and can be vulcanized in a higher speed.

(3) Intrinsic Viscosity $[\eta]$

The intrinsic viscosity $[\eta]$ of the copolymer rubber (A) is 0.5 to 2.0 dl/g, preferably 0.6 to 1.8 dl/g as measured in decalin solvent at 135° C.

(4) $g\eta^{\ddagger}$ or g' Value

The $g\eta^{\ddagger}$ value is defined as a ratio $([\eta]/[\eta]_{blank})$ of the intrinsic viscosity $[\eta]$ as measured in (3) above to an intrinsic viscosity $[\eta]_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity $[\eta]$. The $g\eta^{\ddagger}$ value may be determined by the method described in Japanese Patent Publication No. H3-14045.

The g' value is defined as a ratio $(g'=[\eta]/[\eta]_{blank}')$ of the intrinsic viscosity $[\eta]$ as measured in (3) above to an intrinsic viscosity $[\eta]_{blank}'$ as reduced to a linear ethylene-propylene copolymer (EPR) having an ethylene content of 70% by mole, which is determined by gel permeation chromatography (GPC, 140° C., o-dichlorobenzene solvent) of the ethylene-α-olefin-non-conjugated polyene copolymer. The g' value may be determined by the method described in Japanese Patent Application Laying Open No. 9-71618.

The $g\eta^{\ddagger}$ or g' value of the copolymer rubber (A) is 0.8 to 0.98, preferably 0.8 to 0.95.

Smaller $g\eta^{\ddagger}$ or g' values, approximating zero (0), indicate that there are more long chain branches present in the molecule. The $g\eta^{\ddagger}$ or g' value of 1 indicates that no long chain branch is present in the molecule, that is the molecule is linear. The $g\eta^{\ddagger}$ or g' values within a certain particular range will provide good properties such as low viscosities under high shear rates upon processing such as kneading and molding and low viscosities under low shear rates after molding and immediately before vulcanization; thus, ethylene-α-olefin-non-conjugated polyene copolymer rubbers having such a $g\eta^{\ddagger}$ or g' value can provide a rubber composition having excellent processability, such as kneading or molding, as well as excellent shape retention after molding and immediately before vulcanization.

Preferably, the ethylene-(α-olefin-non-conjugated polyene copolymer rubber has a $g\eta^{\ddagger}$ or g' value in the range of 0.4 to 0.98 in view of the shape retention and processability.

The copolymer rubber (B) has the following properties:
(1) Ethylene/α-olefin Component Ratio The copolymer rubber (B) comprises (a) units derived from ethylene and (b) units derived from the α-olefin having 3 to 20 carbon atoms (hereinafter sometimes referred to simply as "α-olefin") in a molar ratio [(a)/(b)] of 50/50 to 95/5, preferably 60/40 to 90/10.

(2) Iodine Value

The iodine value of the copolymer rubber (B) is 5 to 35, preferably 10 to 30. Ethylene-α-olefin-non-conjugated polyene copolymer rubbers having such an iodine value show a higher vulcanizing rate and can be vulcanized in a higher speed.

(3) Intrinsic Viscosity $[\eta]$

The intrinsic viscosity $[\eta]$ of the copolymer rubber (B) is 3.0 to 10.0 dl/g, preferably 3.5 to 8.0 dl/g as measured in decalin solvent at 135° C.

(4) gη‡ or g' Value

The gη‡ or g' value of the copolymer rubber (B) is 0.4 to 0.9, preferably 0.5 to 0.85.

Preferably, the copolymer rubber of the second invention comprises the copolymer rubber (A) and the copolymer rubber (B) in a weight ratio of 75/25 to 5/95 in view of the compression set, strength of cured rubber, rolling processability and extrusion processability. The weight ratio [(A)/(B)] is preferably 70/30 to 15/85, more preferably 65/35 to 25/75.

Preferably, the copolymer rubber of the second invention (or the copolymer rubber mixture after blending when the copolymer rubber (A) and the copolymer rubber (B) are blended) has an intrinsic viscosity [η] of 1.5 to 5.0 dl/g as measured in decalin solvent at 135° C. in view of the compression set, shape retention, kneadability and extrudability. The intrinsic viscosity [η] is preferably 1.7 to 4.5, more preferably 2.0 to 4.0 dl/g.

Preferably, the copolymer rubber of the second invention (or the copolymer rubber mixture after blending when the copolymer rubber (A) and the copolymer rubber (B) are blended) has an iodine value of 10 to 40 in view of the compression set, producibility of polymer and heat aging resistance. The iodine value is preferably 15 to 40, more preferably 20 to 35.

Preferably, the copolymer rubber of the second invention (or the copolymer rubber mixture after blending when the copolymer rubber (A) and the copolymer rubber (B) are blended) has a gη‡ or g' value of 0.6 to 0.9 in view of the kneadability, strength of cured rubber and shape retention. The gη‡ or g' value is preferably 0.65 to 0.9, more preferably 0.7 to 0.9.

The copolymer rubbers of the first and second inventions as well as the aforementioned copolymer rubbers (A) and (B) may be obtained by random copolymerizing ethylene, an α-olefin having 3 to 20 carbon atoms and a non-conjugated polyene in the presence of a catalyst, preferably a metallocene catalyst.

The metallocene catalyst used herein comprises a specific metallocene compound (C) as below mentioned.

As far as the metallocene catalyst contains the metallocene compound (C), the metallocene catalyst is not particularly limited. For example, it may be composed of the metallocene compound (C); and an organic aluminum oxy compound (D) and/or a compound (E) capable of reacting with the metallocene compound (C) to form an ion pair. Further, it may comprise an organic aluminum compound (F) in addition to the metallocene compound (C), and the organic aluminum oxy compound (D) and/or the compound (E) capable of reacting with the metallocene compound (C) to form an ion pair.

Hereinbelow, the components used in forming the metallocene catalyst will be described.

The metallocene compound (c) may be any compound represented by the following general formula (I):

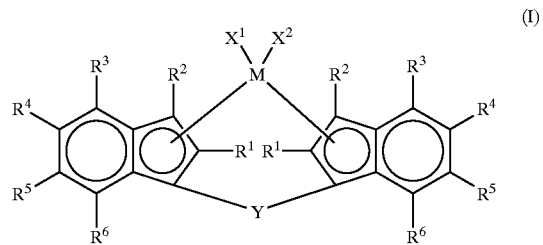

In the formula (I) above, M is a transition metal atom of the IVB group in the periodic table, as exemplified by titanium, zirconium and hafnium. Particularly preferred is zirconium.

$R^1$ is a hydrocarbon group having 1 to 6 carbon atoms, including alkyl groups, such as methyl, ethyl, n-propyl, isopropyl, n-butyl, isobutyl, sec-butyl, tert-butyl, n-pentyl, neopentyl, n-hexyl and cyclohexyl groups; and alkenyl groups, such as vinyl and propenyl groups. Among these, preferred is an alkyl group in which the carbon atom linked to the indenyl group is primary, more preferably an alkyl group having 1 to 4 carbon atoms, most preferably methyl and ethyl groups.

$R^2$, $R^4$, $R^5$ and $R^6$, which may be same or different, are each hydrogen, halogen or hydrocarbon group having 1 to 6 carbon atoms as shown above for $R^1$. The halogen atom includes fluorine, chlorine, bromine and iodine.

$R^3$ is an aryl group having 6 to 16 carbon atoms. The aryl group may be substituted with, for example, one or more substituents selected from halogen atoms as aforementioned, hydrocarbon groups having 1 to 20 carbon atoms and organic silyl groups. The aryl group may include phenyl, α-naphthyl, β-naphthyl, anthracenyl, phenanthryl, pyrenyl, acenaphthyl, phenalenyl, aceanthrylenyl, tetrahydronaphthyl, indanyl and biphenyl groups. Among these, preferred are phenyl, naphthyl, anthracenyl and phenanthryl groups.

The hydrocarbon groups having 1 to 20 carbon atoms as the substituent on the aryl group may include, for example, alkyl groups, such as methyl, ethyl, propyl, butyl, hexyl, cyclohexyl, octyl, nonyl, dodecyl, eicosyl, norbornyl and adamantyl groups; alkenyl groups, such as vinyl, propenyl and cyclohexenyl groups; arylalkyl groups, such as benzyl, phenylethyl and phenylpropyl groups; aryl groups as exemplified for $R^3$; and aryl groups having 6 to 20 carbon atoms, such as tolyl, dimethylphenyl, trimethylphenyl, ethylphenyl, propylphenyl, methylnaphthyl and benzylphenyl groups.

The organic silyl groups may include trimethylsilyl, triethylsilyl and triphenylsilyl groups.

$X^1$ and $X^2$, which may be same or different, are each hydrogen atom, halogen atom as aforementioned, hydrocarbon group having 1 to 20 carbon atoms which may optionally be substituted with one or more halogen atoms as aforementioned, oxygen-containing group, or sulfur-containing group.

The oxygen-containing group may include hydroxyl group; alkoxy groups having 1 to 20 carbon atoms, such as methoxy, ethoxy, propoxy and butoxy groups; aryloxy groups, such as phenoxy, methylphenoxy, dimethylphenoxy and naphthoxy groups; and aryl-$C_{1-20}$ alkoxy groups, such as phenylmethoxy and phenylethoxy groups.

The sulfur-containing group may include those substituents in which the oxygen atom in the aforementioned oxygen-containing groups is replaced with sulfur atom; sulfonyloxy groups, such as methylsulfonyloxy, trifluoromethanesulfonyloxy, phenylsulfonyloxy, benzylsulfonyloxy, p-toluenesulfonyloxy, trimethylbenzenesulfonyloxy, triisobutylbenzenesulfonyloxy, p-chlorobenzenesulfonyloxy and pentafluorobenzenesulfonyloxy groups; and sulfonyl groups, such as methylsulfonyl, phenylsulfonyl, benzenesulfonyl, p-toluenesulfonyl, trimethylbenzenesulfonyl and pentafluorobenzenesulfonyl groups.

Preferably, $X^1$ and $X^2$ are each halogen atom or hydrocarbon group having 1 to 20 carbon atoms.

Y is a divalent hydrocarbon group having 1 to 20 carbon atoms, a divalent halogenated hydrocarbon group having 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— wherein $R^7$ is a hydrogen atom, a halogen atom as aforementioned, a hydrocarbon group having 1 to 20 carbon atoms as aforementioned, or a hydrocarbon group having 1 to 20 carbon atoms and substituted with one or more halogen atoms as aforementioned. Illustratively, it may include divalent hydrocarbon groups having 1 to 20 carbon atoms, including alkylene groups, such as methylene, dimethylmethylene, ethylene, dimethylethylene, trimethylene, tetramethylene, 1,2-cyclohexylene and 1,4-cyclohexylene groups, alkylidene groups, such as cyclohexylidene group, and arylalkylene groups, such as diphenylmethylene and diphenylethylene groups; divalent halogenated hydrocarbon groups having 1 to 20 carbon atoms, such as chloromethylene; divalent silicon-containing groups, including alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene groups, alkyldisilyl, alkylaryldisilyl and aryldisilyl groups, such as tetramethyl-1,2-disilyl and tetraphenyl-1,2-disilyl groups; and divalent germanium-containing groups in which the silicon atom in the divalent silicon-containing groups as aforementioned is replaced with germanium atom.

Preferably, Y is a divalent silicon- or germanium-containing group, more preferably a divalent silicon-containing group, most preferably an alkylsilylene, alkylarylsilylene or arylsilylene group.

Illustrative examples of the metallocene compounds represented by the general formula (I) above are shown below.

rac-dimethylsilylene-bis(2-methyl-4-phenyl-1-indenyl)zirconium dichloride;
rac-dimethylsilylene-bis(2-methyl-4-(α-naphthyl)-1-indenyl)zirconium dichloride;
rac-dimethylsilylene-bis(2-methyl-4-(β-naphthyl)-1-indenyl)zirconium dichloride;
rac-dimethylsilylene-bis(2-methyl-4-(1-anthracenyl)-1-indenyl)zirconium dichloride;
rac-dimethylsilylene-bis(2-methyl-4-(2-anthracenyl)-1-indenyl)zirconium dichloride;
rac-dimethylsilylene-bis(2-methyl-4-(9-anthracenyl)-1-indenyl)zirconium dichloride;
rac-dimethylsilylene-bis(2-methyl-4-(9-phenanthryl)-1-indenyl)zirconium dichloride;
rac-dimethylsilylene-bis(2-methyl-4-(p-fluorophenyl)-1-indenyl)zirconium dichloride;
rac-dimethylsilylene-bis(2-methyl-4-(pentafluorophenyl)-1-indenyl)zirconium dichloride;
rac-dimethylsilylene-bis(2-methyl-4-(p-chlorophenyl)-1-indenyl)zirconium dichloride;
rac-dimethylsilylene-bis(2-methyl-4-(m-chlorophenyl)-1-indenyl)zirconium dichloride;
rac-dimethylsilylene-bis(2-methyl-4-(o-chlorophenyl)-1-indenyl)zirconium dichloride;
rac-dimethylsilylene-bis(2-methyl-4-(2,4-dichlorophenyl)phenyl-1-indenyl)zirconium dichloride;
rac-dimethylsilylene-bis(2-methyl-4-(p-bromophenyl)-1-indenyl)zirconium dichloride;
rac-dimethylsilylene-bis(2-methyl-4-(p-tolyl)-1-indenyl)zirconium dichloride;
rac-dimethylsilylene-bis(2-methyl-4-(m-tolyl)-1-indenyl)zirconium dichloride;
rac-dimethylsilylene-bis(2-methyl-4-(o-tolyl)-1-indenyl)zirconium dichloride;
rac-dimethylsilylene-bis(2-methyl-4-(2,6-dimethylphenyl)-1-indenyl)zirconium dichloride;
rac-dimethylsilylene-bis(2-methyl-4-(p-ethylphenyl)-1-indenyl)zirconium dichloride;
rac-dimethylsilylene-bis(2-methyl-4-(p-isopropylphenyl)-1-indenyl)zirconium dichloride;
rac-dimethylsilylene-bis(2-methyl-4-(p-benzylphenyl)-1-indenyl)zirconium dichloride;
rac-dimethylsilylene-bis(2-methyl-4-(p-biphenylyl)-1-indenyl)zirconium dichloride;
rac-dimethylsilylene-bis(2-methyl-4-(m-biphenylyl)-1-indenyl)zirconium dichloride;
rac-dimethylsilylene-bis(2-methyl-4-(p-trimethylsilylphenyl)-1-indenyl)zirconium dichloride;
rac-dimethylsilylene-bis(2-methyl-4-(m-trimethylsilylphenyl)-1-indenyl)zirconium dichloride;
rac-dimethylsilylene-bis(2-phenyl-4-phenyl-1-indenyl)zirconium dichloride;
rac-diethylsilylene-bis(2-methyl-4-phenyl-1-indenyl)zirconium dichloride;
rac-di-(isopropyl)silylene-bis(2-methyl-4-phenyl-1-indenyl)zirconium dichloride;
rac-di-(n-butyl)silylene-bis(2-methyl-4-phenyl-1-indenyl)zirconium dichloride;
rac-dicyclohexylsilylene-bis(2-methyl-4-phenyl-1-indenyl)zirconium dichloride;
rac-methylphenylsilylene-bis(2-methyl-4-phenyl-1-indenyl)zirconium dichloride;
rac-diphenylsilylene-bis(2-methyl-4-phenyl-1-indenyl)zirconium dichloride;
rac-di(p-tolyl)silylene-bis(2-methyl-4-phenyl-1-indenyl)zirconium dichloride;
rac-di(p-chlorophenyl)silylene-bis(2-methyl-4-phenyl-1-indenyl)zirconium dichloride;
rac-methylene-bis(2-methyl-4-phenyl-1-indenyl)zirconium dichloride;
rac-ethylene-bis(2-methyl-4-phenyl-1-indenyl)zirconium dichloride;
rac-dimethylgermylene-bis(2-methyl-4-phenyl-1-indenyl)zirconium dichloride;
rac-dimethylstannylene-bis(2-methyl-4-phenyl-1-indenyl)zirconium dichloride;
rac-dimethylsilylene-bis(2-methyl-4-phenyl-1-indenyl)zirconium dibromide;
rac-dimethylsilylene-bis(2-methyl-4-phenyl-1-indenyl)zirconium dimethyl;
rac-dimethylsilylene-bis(2-methyl-4-phenyl-1-indenyl)zirconium methyl chloride;
rac-dimethylsilylene-bis(2-methyl-4-phenyl-1-indenyl)zirconium chloride SO$_2$Me;
rac-dimethylsilylene-bis(2-methyl-4-phenyl-1-indenyl)zirconium chloride OSO$_2$Me;
rac-dimethylsilylene-bis(2-ethyl-4-phenyl-1-indenyl)zirconium dichloride;
rac-dimethylsilylene-bis(2-ethyl-4-(α-naphthyl)-1-indenyl)zirconium dichloride;

rac-dimethylsilylene-bis(2-ethyl-4-(β-naphthyl)-1-indenyl)
zirconium dichloride;
rac-dimethylsilylene-bis(2-ethyl-4-(2-methyl-1-naphthyl)-
1-indenyl)zirconium dichloride;
rac-dimethylsilylene-bis(2-ethyl-4-(5-acenaphthyl)-1-
indenyl)zirconium dichloride;
rac-dimethylsilylene-bis(2-ethyl-4-(9-anthracenyl)-1-
indenyl)zirconium dichloride;
rac-dimethylsilylene-bis(2-ethyl-4-(9-phenanthryl)-1-
indenyl)zirconium dichloride;
rac-dimethylsilylene-bis(2-ethyl-4-(o-methylphenyl)-1-
indenyl)zirconium dichloride;
rac-dimethylsilylene-bis(2-ethyl-4-(m-methylphenyl)-1-
indenyl)zirconium dichloride;
rac-dimethylsilylene-bis(2-ethyl-4-(p-methylphenyl)-1-
indenyl)zirconium dichloride;
rac-dimethylsilylene-bis(2-ethyl-4-(2,3-dimethylphenyl)-1-
indenyl)zirconium dichloride;
rac-dimethylsilylene-bis(2-ethyl-4-(2,4-dimethyphenyl)-1-
indenyl)zirconium dichloride;
rac-dimethylsilylene-bis(2-ethyl-4-(2,5-dimethylphenyl)-1-
indenyl)zirconium dichloride;
rac-dimethylsilylene-bis(2-ethyl-4-(2,4,6-trimethylphenyl)-
1-indenyl)zirconium dichloride;
rac-dimethylsilylene-bis(2-ethyl-4-(o-chlorophenyl)-1-
indenyl)zirconium dichloride;
rac-dimethylsilylene-bis(2-ethyl-4-(m-chlorophenyl)-1-
indenyl)zirconium dichloride;
rac-dimethylsilylene-bis(2-ethyl-4-(p-chlorophenyl)-1-
indenyl)zirconium dichloride;
rac-dimethylsilylene-bis(2-ethyl-4-(2,3-dichlorophenyl)-1-
indenyl)zirconium dichloride;
rac-dimethylsilylene-bis(2-ethyl-4-(2,6-dichlorophenyl)-1-
indenyl)zirconium dichloride;
rac-dimethylsilylene-bis(2-ethyl-4-(3,5-dichlorophenyl)-1-
indenyl)zirconium dichloride;
rac-dimethylsilylene-bis(2-ethyl-4-(2-bromophenyl)-1-
indenyl)zirconium dichloride;
rac-dimethylsilylene-bis(2-ethyl-4-(3-bromophenyl)-1-
indenyl)zirconium dichloride;
rac-dimethylsilylene-bis(2-ethyl-4-(4-bromophenyl)-1-
indenyl)zirconium dichloride;
rac-dimethylsilylene-bis(2-ethyl-4-(4-biphenylyl)-1-
indenyl)zirconium dichloride;
rac-dimethylsilylene-bis(2-ethyl-4-(4-trimethylsilylphenyl)-
1-indenyl)zirconium dichloride;
rac-dimethylsilylene-bis(2-n-propyl-4-phenyl-1-indenyl)
zirconium dichloride;
rac-dimethylsilylene-bis(2-n-propyl-4-(α-naphthyl)-1-
indenyl)zirconium dichloride;
rac-dimethylsilylene-bis(2-n-propyl-4-(β-naphthyl)-1-
indenyl)zirconium dichloride;
rac-dimethylsilylene-bis(2-n-propyl-4-(2-methyl-1-
naphthyl)-1-indenyl)zirconium dichloride;
rac-dimethylsilylene-bis(2-n-propyl-4-(5-acenaphthyl)-1-
indenyl)zirconium dichloride;
rac-dimethylsilylene-bis(2-n-propyl-4-(9-anthracenyl)-1-
indenyl)zirconium dichloride;
rac-dimethylsilylene-bis(2-n-propyl-4-(9-phenanthryl)-1-
indenyl)zirconium dichloride;
rac-dimethylsilylene-bis(2-isopropyl-4-phenyl-1-indenyl)
zirconium dichloride;
rac-dimethylsilylene-bis(2-isopropyl-4-(α-naphthyl)-1-
indenyl)zirconium dichloride;
rac-dimethylsilylene-bis(2-isopropyl-4-(β-naphthyl)-1-
indenyl)zirconium dichloride;
rac-dimethylsilylene-bis(2-isopropyl-4-(8-methyl-9-
naphthyl)-1-indenyl)zirconium dichloride;
rac-dimethylsilylene-bis(2-isopropyl-4-(5-acenaphthyl)-1-
indenyl)zirconium dichloride;
rac-dimethylsilylene-bis(2-isopropyl-4-(9-anthracenyl)-1-
indenyl)zirconium dichloride;
rac-dimethylsilylene-bis(2-isopropyl-4-(9-phenanthryl)-1-
indenyl)zirconium dichloride;
rac-dimethylsilylene-bis(2-s-butyl-4-phenyl-1-indenyl)
zirconium dichloride;
rac-dimethylsilylene-bis(2-s-butyl-4-(α-naphthyl)-1-
indenyl)zirconium dichloride;
rac-dimethylsilylene-bis(2-s-butyl-4-(β-naphthyl)-1-
indenyl)zirconium dichloride;
rac-dimethylsilylene-bis(2-s-butyl-4-(2-methyl-1-
naphthyl)-1-indenyl)zirconium dichloride;
rac-dimethylsilylene-bis(2-s-butyl-4-(5-acenaphthyl)-1-
indenyl)zirconium dichloride;
rac-dimethylsilylene-bis(2-s-butyl-4-(9-anthracenyl)-1-
indenyl)zirconium dichloride;
rac-dimethylsilylene-bis(2-s-butyl-4-(9-phenanthryl)-1-
indenyl)zirconium dichloride;
rac-dimethylsilylene-bis(2-n-pentyl-4-phenyl-1-indenyl)
zirconium dichloride;
rac-dimethylsilylene-bis(2-n-pentyl-4-(α-naphthyl)-1-
indenyl)zirconium dichloride;
rac-dimethylsilylene-bis(2-n-butyl-4-phenyl-1-indenyl)
zirconium dichloride;
rac-dimethylsilylene-bis(2-n-butyl-4-(α-naphthyl)-1-
indenyl)zirconium dichloride;
rac-dimethylsilylene-bis(2-n-butyl-4-(β-naphthyl)-1-
indenyl)zirconium dichloride;
rac-dimethylsilylene-bis(2-n-butyl-4-(2-methyl-1-
naphthyl)-1-indenyl)zirconium dichloride;
rac-dimethylsilylene-bis(2-n-butyl-4-(5-acenaphthyl)-1-
indenyl)zirconium dichloride;
rac-dimethylsilylene-bis(2-n-butyl-4-(9-anthracenyl)-1-
indenyl)zirconium dichloride;
rac-dimethylsilylene-bis(2-n-butyl-4-(9-phenanthryl)-1-
indenyl)zirconium dichloride;
rac-dimethylsilylene-bis(2-isobutyl-4-phenyl-1-indenyl)
zirconium dichloride;
rac-dimethylsilylene-bis(2-isobutyl-4-(α-naphthyl)-1-
indenyl)zirconium dichloride;
rac-dimethylsilylene-bis(2-isobutyl-4-(β-naphthyl)-1-
indenyl)zirconium dichloride;
rac-dimethylsilylene-bis(2-isobutyl-4-(2-methyl-1-
naphthyl)-1-indenyl)zirconium dichloride;
rac-dimethylsilylene-bis(2-isobutyl-4-(5-acenaphthyl)-1-
indenyl)zirconium dichloride;
rac-dimethylsilylene-bis(2-isobutyl-4-(9-anthracenyl)-1-
indenyl)zirconium dichloride;
rac-dimethylsilylene-bis(2-isobutyl-4-(9-phenanthryl)-1-
indenyl)zirconium dichloride;
rac-dimethylsilylene-bis(2-neopentyl-4-phenyl-1-indenyl)
zirconium dichloride;
rac-dimethylsilylene-bis(2-neopentyl-4-(α-naphthyl)-1-
indenyl)zirconium dichloride;
rac-dimethylsilylene-bis(2-n-hexyl-4-phenyl-1-indenyl)
zirconium dichloride;
rac-dimethylsilylene-bis(2-n-hexyl-4-(α-naphthyl)-1-
indenyl)zirconium dichloride;
rac-methylphenylsilylene-bis(2-ethyl-4-phenyl-1-indenyl)
zirconium dichloride;
rac-methylphenylsilylene-bis(2-ethyl-4-(α-naphthyl)-1-
indenyl)zirconium dichloride;
rac-methylphenylsilylene-bis(2-ethyl-4-(9-anthracenyl)-1-
indenyl)zirconium dichloride;
rac-methylphenylsilylene-bis(2-ethyl-4-(9-phenanthryl)-1-
indenyl)zirconium dichloride;

rac-diphenylsilylene-bis(2-ethyl-4-phenyl-1-indenyl) zirconium dichloride;
rac-diphenylsilylene-bis(2-ethyl-4-(α-naphthyl)-1-indenyl) zirconium dichloride;
rac-diphenylsilylene-bis(2-ethyl-4-(9-anthracenyl)-1-indenyl)zirconium dichloride;
rac-diphenylsilylene-bis(2-ethyl-4-(9-phenanthryl)-1-indenyl)zirconium dichloride;
rac-diphenylsilylene-bis(2-ethyl-4-(4-biphenylyl)-1-indenyl)zirconium dichloride;
rac-methylene-bis(2-ethyl-4-phenyl-1-indenyl)zirconium dichloride;
rac-methylene-bis(2-ethyl-4-(α-naphthyl)-1-indenyl) zirconium dichloride;
rac-ethylene-bis(2-ethyl-4-phenyl-1-indenyl)zirconium dichloride;
rac-ethylene-bis(2-ethyl-4-(α-naphthyl)-1-indenyl) zirconium dichloride;
rac-ethylene-bis(2-n-propyl-4-(α-naphthyl)-1-indenyl) zirconium dichloride;
rac-dimethylgermyl-bis(2-ethyl-4-phenyl-1-indenyl) zirconium dichloride;
rac-dimethylgermyl-bis(2-ethyl-4-(α-naphthyl)-1-indenyl) zirconium dichloride;
rac-dimethylgermyl-bis(2-n-propyl-4-phenyl-1-indenyl) zirconium dichloride; etc.

Also included are compounds in which the zirconium atom in the aforementioned compounds is replaced with titanium or hafnium.

In the present invention, racemic modifications of the aforementioned metallocene compounds are generally used as the catalytic component. However, R or S modifications thereof may be also used.

In the present invention, the aforementioned metallocene compounds may be in any combinations of two or more thereof.

The metallocene compounds may be prepared according to the method described in Journal of Organometallic Chem. 288 (1985), p. 63–67; and EP-A-0,320,762.

The organic aluminum oxy compounds (D) used to prepare the metallocene catalysts may be any of conventionally known aluminoxanes or benzene insoluble organic aluminum oxy compounds disclosed in Japanese Patent Application Laying Open No. 2-78687.

Conventionally known aluminoxanes may be prepared, for example, by the following method:

(1) An organic aluminum compound, such as a trialkylaluminum, is added to a suspension of a compound containing absorbed water or a salt containing water of crystallization, such as magnesium chloride hydrate, copper sulfate hydrate, aluminum sulfate hydrate, nickel sulfate hydrate or cerous chloride hydrate, in a hydrocarbon medium to react followed by recovery of a hydrocarbon solution;

(2) Water, ice or water vapor is directly acted on an organic aluminum compound, such as a trialkylaluminum, in a medium, such as benzene, toluene, ethyl ether or tetrahydrofuran, followed by recovery of a hydrocarbon solution; or (3) An organic tin oxide, such as dimethyl tin oxide or dibutyl tin oxide, is reacted with an organic aluminum compound, such as a trialkylaluminum, in a medium, such as decane, benzene or toluene.

The alminoxane may contain a small amount of organic metallic component(s). The solvent or unreacted organic aluminum compound may be distilled out of the recovered aluminoxane solution followed by re-dissolution in a solvent.

The organic aluminum compound used to prepare the aluminoxane may include trialkylaluminum, such as trimethylaluminum, triethylaluminum, tripropylaluminum, triisopropylaluminum, tri-n-butylaluminum, tri-isobutylaluminum, tri-sec-butylaluminum, tri-tert-butylaluminum, tripentylaluminum, trihexylaluminum, trioctylaluminum or tridecylaluminum; tricycloalkylaluminum, such as tricyclohexylaluminum or tricyclooctylaluminum; dialkylaluminum halide, such as dimethylaluminum chloride, diethylaluminum chloride, diethylaluminum bromide or diisobutylaluminum chloride; dialkylaluminum hydride, such as diethylaluminum hydride or diisobutylaluminum hydride; dialkylaluminum alkoxide, such as dimethylaluminum methoxide or diethylaluminum ethoxide; and dialkylaluminum aryloxide, such as diethylaluminum phenoxide. Among these, trialkylaluminum and tricycloalkylaluminum are particularly preferred.

The organic aluminum compound used to prepare the aluminoxane may also include an isoprenyl aluminum represented by the formula:

$(i\text{-}C_4H_9)_x Al_y (C_5H_{10})_z$ wherein x, y and z are positive numbers, provided that $z \geq 2x$.

These organic aluminum compounds may be used in any combinations of two or more thereof.

The solvent used in the preparation of the aluminoxane may include, for example, hydrocarbon solvents including aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosene and gas oil; and halogenated, particularly chlorinated or brominated, hydrocarbon solvents, such as halogenated products of the aforementioned aromatic, aliphatic and alicyclic hydrocarbons. Further, ethers such as ethyl ether and tetrahydrofuran may also be used. Among these solvents, aromatichydrocarbons are particularly preferred.

The compounds (E) capable of reacting with the aforementioned metallocene compound (C) to form an ion pair may include Lewis acids, ionic compounds, borane compounds and carborane compounds described in Japanese Patent Application Laying Open Nos. 1-501950, 1-502036, 3-179005, 3-179006, 3-207703 and 3-207704 and U.S. Pat. No. 5,321,106.

The Lewis acids may include magnesium-, aluminum- or boron-containing Lewis acids with boron-containing Lewis acids being preferred. Illustrative examples of the boron-containing Lewis acids are compounds represented by the following general formula:

$BR^8 R^9 R^{10}$ wherein $R^8$, $R^9$ and $R^{10}$ independently represent fluorine atom, or phenyl group optionally substituted with a substituent or substituents, such as fluorine atom, methyl or trifluoromethyl group.

Examples of the boron-containing Lewis acids represented by the general formula above may include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron, and tris(3,5-dimethylphenyl)boron. Among these, tris(pentafluorophenyl)boron is particularly preferred.

The ionic compounds are salts composed of cationic and anionic compounds. The anion can stabilize transition metallic cation species by reacting with the metallocene compound (C) to cationize the metallocene compound (C) thereby forming an ion pair. Such anions may include organic boron, arsenic and aluminum compound anions. Preferred anions are those which are relatively bulky and stabilize the transition metal cationic species. The cations may include metallic, organic metallic, carbonium, tripium, oxonium, sulfonium, phosphonium, and ammonium cations. Illustrative examples thereof may include triphenylcarbenium, tributylammonium, N,N-dimethylammonium and ferrocenium cations.

Preferred ionic compounds may be those having organic boron compound anions. Illustrative examples thereof include trialkyl-substituted ammonium salts, such as triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra (pentafluorophenyl)boron, tripropylammonium tetra(2,4-dimethylphenyl)boron, tributylammonium tetra(3,5-dimethylphenyl)boron, tributylammonium tetra(p-trifluoromethylphenyl)boron, tri(n-butyl)ammonium tetra (o-tolyl)boron, and tri(n-butyl)ammonium tetra(4-fluorophenyl)boron; N,N-dialkylanilinium salts, such as N,N-dimethylanilinium tetra(phenyl)boron, N,N-diethylanilinium tetra(phenyl)boron, and N,N-2,4,6-pentamethylanilinium tetra(phenyl)boron; dialkylammonium salts, such as di(n-propyl)ammonium tetra (pentafluorophenyl)boron, and dicyclohexylammonium tetra(phenyl)boron; and triarylphosphonium salts, such as triphenylphosphonium tetra(phenyl)boron, tri (methylphenyl)phosphonium tetra(phenyl)boron, and tri (dimethylphenyl)phosphonium tetra(phenyl)boron.

Also included in the boron atom-containing ionic compounds are triphenylcarbenium tetrakis(pentafluorophenyl) borate, N,N-dimethylanilinium tetrakis(pentafluorophenyl) borate, and ferrocenium tetra(pentafluorophenyl)borate.

The following ionic compounds containing boron atom may also be exemplified (in the following ionic compounds, the counterion is tri(n-butyl)ammonium but not limited thereto):

Salts of anions, for example, bis[tri(n-butyl)ammonium] nonaborate, bis[tri(n-butyl)ammonium]decaborate, bis[tri (n-butyl)ammonium]undecaborate, bis[tri(n-butyl) ammonium]dodecaborate, bis[tri(n-butyl)ammonium] decachloroborate, bis[tri(n-butyl)ammonium] dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammonium bromo-1-carbadodecaborate. Further, the following borane and carborane compounds may be encompassed. These compounds are used as Lewis acids and ionic compounds.

Examples of the borane compounds, carborane complex compounds and salts of carborane anions include, for example, decaborane (14), 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium 6-carbadecaborate (14), tri(n-butyl)ammonium 6-carbadecaborate (12), tri(n-butyl)ammonium 7-carbaundecaborate (13), tri(n-butyl)ammonium 7,8-dicarbaundecaborate (12), tri(n-butyl)ammonium 2,9-dicarbaundecaborate (12), tri(n-butyl)ammonium dodecahydride-8-methyl 7,9-dicarbaundecaborate, tri(n-butyl)ammonium undecahydride 8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, tri (n-butyl)ammonium undecahydride-4,6-dibromo-7-carbaundecaborate.

Examples of the carborane compounds and salts of carboranes may include, for example, 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane, undecahydride-1,3-dimethyl-1,3-dicarbanonaborane.

Further, the following compounds may be exemplified (in the following ionic compounds, the counterion is tri(n-butyl) ammonium but not limited thereto):

Salts of metallic carboranes and metallic borane anions, such as, for example, tri(n-butyl)ammonium bis (nonahydride-1,3-dicarbanonaborate)cobaltate (III), tri(n-butyl)ammonium bis(undecahydride-7,8-dicarbaundecaborate)ferrate (III), tri(n-butyl)ammonium bis (undecahydride-7,8-dicarbaundecaborate)cobaltate (III), tri (n-butyl)ammonium bis(undecahydride-7,8-dicarbaundecaborate)nickelate (III), tri(n-butyl)ammonium bis(undecahydride-7,8-dicarbaundecaborate)cuprate (III), tri(n-butyl)ammonium bis(undecahydride-7,8-dicarbaundecaborate)aurate (III), tri(n-butyl)ammonium bis (nonahydride-7,8-dimethyl-7,8-dicarbaundecaborate)ferrate (III), tri(n-butyl)ammonium bis(nonahydride-7,8-dimethyl-7,8-dicarbaundecaborate)chromate (III), tri(n-butyl) ammonium bis(tribromooctahydride-7,8-dicarbaundecaborate)cobaltate (III), tri(n-butyl)ammonium bis(dodecahydride dicarbadodecaborate)cobaltate (III), bis [tri(n-butyl)ammonium]bis(dodecahydride dodecaborate) nickelate (III), tris[tri(n-butyl)ammonium]bis (undecahydride-7-carbaundecaborate)chromate (III), bis[tri (n-butyl)ammonium]bis(undecahydride-7-carbaundecaborate)manganate (IV), bis[tri(n-butyl) ammonium]bis(undecahydride-7-carbaundecaborate) cobaltate (III), bis[tri(n-butyl)ammonium]bis (undecahydride-7-carbaundecaborate)nickelate (IV).

These compounds (E) may be in any combinations of two or more thereof.

The organic aluminum compounds (F) used in the present invention may be represented by, for example, the following general formula (a):

$$R^{11}_n AlX_{3-n} \qquad (a)$$

wherein $R^{11}$ is a hydrocarbon group having 1 to 12 carbon atoms, X is a halogen or hydrogen atom, and n is 1 to 3.

In the formula (a) above, $R^{11}$ is a hydrocarbon group, such as alkyl, cycloalkyl or aryl group, having 1 to 12 carbon atoms and includes methyl, ethyl, n-propyl, isopropyl, isobutyl, pentyl, hexyl, octyl, cyclopentyl, cyclohexyl, phenyl and tolyl groups.

Illustrative examples of such organic aluminum compounds may include trialkylaluminum, such as trimethylaluminum, triethylaluminum, triisopropylaluminum, triisobutylaluminum, trioctylaluminum, tri-2-ethylhexylaluminum; alkenylaluminum, such as isoprenylaluminum; dialkylaluminum halides, such as dimethylaluminum chloride, diethylaluminum chloride, diisopropylaluminum chloride, diisobutylaluminum chloride, dimethylaluminum bromide; alkylaluminum sesquihalides, such as methylaluminum sesquichloride, ethylaluminum sesquichloride, isopropylaluminum sesquichloride, butylaluminum sesquichloride, ethylaluminum sesquibromide; alkylaluminum dihalides, such as methylaluminum dichloride, ethylaluminum dichloride, isopropylaluminum dichloride, ethylaluminum dibromide; and alkylaluminum hydrides, such as diethylaluminum hydride, diisobutylaluminum hydride.

As the organic aluminum compounds (F), those compounds represented by the following formula (b):

  (b)

wherein $R^{11}$ is as defined for $R^{11}$ in the formula (a) above, Y is —$OR^{12}$, —$OSiR^{13}{}_3$, —$OAlR^{14}{}_2$, —$NR^{15}{}_2$, —$SiR^{16}{}_3$ or —$N(R^{17})AlR^{18}{}_2$ group, n is 1 to 2, $R^{12}$, $R^{13}$, $R^{14}$ and $R^{18}$ are methyl, ethyl, isopropyl, isobutyl, cyclohexyl, phenyl or the like groups, $R^{15}$ is hydrogen atom, methyl, ethyl, isopropyl, phenyl, trimethylsilyl or the like group, $R^{16}$ and $R^{17}$ are methyl, ethyl or the like groups, may also be used.

Such organic aluminum compounds may include the following compounds:
  (i) Compounds represented by $R^{11}{}_n Al(OR^{12})_{3-n}$, including dimethylaluminum methoxide, diethylaluminum ethoxide, diisobutylaluminum methoxide, etc.;
  (ii) Compounds represented by $R^{11}{}_n Al(OSiR^{13}{}_3)_{3-n}$, including $(C_2H_5)_2Al(OSi(CH_3)_3)$, $(iso\text{-}C_4H_9)_2Al(OSi(CH_3)_3)$, $(iso\text{-}C_4H_9)_2Al(OSi(C_2H_5)_3)$, etc.;
  (iii) Compounds represented by $R^{11}{}_n Al(OAlR^{14}{}_2)_{3-n}$, including $(C_2H_5)_2Al(OAl(C_2H_5)_2)$, $(iso\text{-}C_4H_9)_2Al(OAl(iso\text{-}C_4H_9)_2)_2$, etc.;
  (iv) Compounds represented by $R^{11}{}_n Al(NR^{15}{}_2)_{3-n}$, including $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$, $(iso\text{-}C_4H_9)_2Al[N(Si(CH_3)_3)_2]$, etc.; and
  (v) Compounds represented by $R^{11}{}_n Al(SiR^{16}{}_3)_{3-n}$, including $(iso\text{-}C_4H_9)_2Al(Si(CH_3)_3)$, etc.

Preferred examples may include the organic aluminum compounds represented by $R^{11}{}_3Al$, $R^{11}{}_n Al(OR^{12})_{3-n}$, and $R^{11}{}_n Al(OAlR^{14}{}_2)_{3-n}$. Those compounds wherein $R^{11}$ is an isoalkyl group and n=2 are particularly preferred. These organic aluminum compounds may be used in any combinations of two or more thereof.

The metallocene catalyst used in the present invention contains a metallocene compound (C) as aforementioned. For example, it may be formed from the metallocene compound (C) and the organic aluminum oxy compound (D), as aforementioned. It may also be formed from the metallocene compound (C) and the compound (E) capable of reacting with the metallocene compound (C) to form an ion pair. Further, it may contain the metallocene compound (C), the organic aluminum oxy compound (D), and the compound (E) capable of reacting with the metallocene compound (C) to form an ion pair. In these embodiments, it is particularly preferred to further use the organic aluminum compound (F).

In the present invention, the metallocene compound (C) is generally used in an amount of about 0.00005 to 0.1 mmoles, preferably about 0.0001 to 0.05 mmoles as reduced to the transition metal atom per liter of the polymerization volume.

The organic aluminum oxy compound (D) may be generally used in an amount of about 1 to 10,000 moles, preferably 10 to 5,000 moles of aluminum atom per mole of the transition metal atom.

The compound (E) capable of reacting with the metallocene compound (C) to form an ion pair is generally used in an amount of about 0.5 to 20 moles, preferably 1 to 10 moles of boron atom per mole of the transition metal atom.

Further, the organic aluminum compound (F) may be optionally used in an amount of about 0 to 1,000 moles, preferably about 0 to 500 moles per mole of aluminum atom in the organic aluminum oxy compound (D) or boron atom in the compound (E) forming an ion pair.

Copolymerization of ethylene, an α-olefin having 3 to 20 carbon atoms and a non-conjugated polyene using such a metallocene catalyst as aforementioned may provide an ethylene-α-olefin-non-conjugated polyene copolymer rubber with an excellent polymerization activity.

In the present invention, when ethylene, an α-olefin having 3 to 20 carbon atoms and a non-conjugated polyene are copolymerized, the metallocene compound (C), organic aluminum oxy compound (D), compound (E) forming an ion pair, and optionally organic aluminum compound (F), which constitute the metallocene catalyst, may be separately supplied to a polymerization reaction vessel. Alternatively, the metallocene catalyst comprising the metallocene compound (C) may be preliminarily prepared and then subjected to the copolymerization reaction.

To prepare the metallocene catalyst, a solvent reactively inert with the catalyst components can be used. Such an inert solvent used may include aliphatic hydrocarbons, such as propane, butane, pentane, hexane, heptane, octane, decane, dodecane and kerocene; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These solvents may be used alone or in any combination thereof.

Generally, the metallocene compound (C), organic aluminum oxy compound (D), compound (E) forming an ion pair, and organic aluminum compound (F) may be mixed and contacted at −100 to 200° C., preferably −70 to 100° C.

Generally, the copolymerization of ethylene, an α-olefin having 3 to 20 carbon atoms and a non-conjugated polyene may be carried out at 40 to 200° C., preferably 50 to 150° C., particularly 60 to 120° C., and atmospheric pressure to 100 kg/cm², preferably atmospheric pressure to 50 kg/cm², particularly atmospheric pressure to 30 kg/cm².

The copolymerization reaction may be carried out by a variety of polymerization methods, preferably by solution polymerization wherein the aforementioned solvent may be used as the polymerization solvent.

The copolymerization may be carried out in a batch, semi-continuous or continuous mode, preferably in a continuous mode. The copolymer rubbers (A) and (B) are preferably blended in the state of a solution, but may be blended in any other manner.

The ethylene-α-olefin-non-conjugated polyene copolymer rubber of the present invention is obtained by the aforementioned method wherein the molecular weight of the copolymer rubber may be controlled by changing the polymerization conditions, such as polymerization temperature, and also by controlling the amount of hydrogen used as a molecular weight controlling agent.

The ethylene-α-olefin-non-conjugated polyene copolymer rubber thus obtained is excellent in extrusion processability.

The third invention is a rubber composition for sealing comprising the ethylene-α-olefin-non-conjugated polyene copolymer rubber of the first or second invention.

The rubber composition of the present invention may be vulcanized or cured by heating in the presence of a curing agent, or by irradiating an electron beam in the absence of a curing agent.

In addition to the ethylene-α-olefin-non-conjugated polyene copolymer rubber, the rubber composition of the present invention may comprise other component(s) so long as the purpose of the present invention is not impaired. The amount of the ethylene-α-olefin-non-conjugated polyene copolymer rubber formulated is generally 20% by weight or more, preferably 20 to 60% by weight, more preferably 25 to 50% by weight, based on the total weight of the rubber composition.

The other components may be any additives, including rubber reinforcing agents, fillers, softening agents, anti-aging agents, processing aids, curing agents, curing promoters, curing aids, flame retardants, and foaming agents, foaming aids, defoaming agents, etc.

The rubber composition of the present invention may further comprise butadiene rubber, styrene-butadiene copolymer rubber, acrylonitrile-butadiene copolymer rubber, chloroprene rubber, acrylic rubber, EPDM, EPR, etc., so long as the purpose of the present invention is not impaired.

The rubber reinforcing agents may enhance the mechanical properties of a cross-linked (vulcanized) rubber, such as tensile strength, tear strength and wear resistance. Such rubber reinforcing agents include carbon black, such as SRF, GPF, FEF, MAF, HAF, ISAF, SAF, FT or MT; silica, activated calcium carbonate, ground talc, ground silicate, and silicate. These rubber reinforcing agents may be treated with silane coupling agents etc.

The fillers are used to increase the hardness of a rubber product and/or reduce the cost, without significantly affecting the properties. Such fillers may include light calcium carbonate, heavy calcium carbonate, talc, clay, etc.

The natures and formulating amounts of these rubber reinforcing agent and filler may be suitably selected depending the use. The total formulating amount of the rubber reinforcing agent and filler is generally 300 parts by weight or less, preferably 50 to 200 parts by weight, based on 100 parts by weight of the total ethylene-α-olefin-non-conjugated polyene copolymer rubber.

The softening agents may be any of those conventionally used for rubbers. Illustrative examples thereof may include petroleum softening agents, such as process oil, lubricating oil, paraffin oil, liquid paraffin, petroleum asphalt and vaseline; coal tar softening agents, such as coal tar and coal tar pitch; fatty oil softening agents, such as castor oil, linseed oil, rape oil, soybean oil and coconut oil; tall oil; rubber substitute (factice); waxes, such as beeswax, carnauba wax and lanolin; fatty acids and fatty acid salts, such as ricinolic acid, palmitic acid, stearic acid, barium stearate, calcium stearate and zinc laurate; naphthenic acid; pine oil, rosin and their derivatives; synthetic high molecular weight materials, such as terpene resin, petroleum resin, atactic polypropylene and coumarone and indene resin; ester softening agents, such as dioctyl phthalate, dioctyl adipate and dioctyl sebacate; microcrystalline wax; liquid polybutadiene; modified liquid polybutadiene; liquid thiokol; and hydrocarbon synthetic lubricating oils. Inter alia, petroleum softening agents, in particular process oils, are preferably used. The amount of the softening agent(s) formulated is generally 150 parts by weight or less, preferably 20 to 100 parts by weight, based on 100 parts by weight of the total ethylene-α-olefin-non-conjugated polyene copolymer rubber.

The anti-aging agent can be formulated in the rubber composition to lengthen the life of the resulting molded rubber part for sealing. The anti-aging agents may include aromatic secondary amine stabilizers, such as phenylnaphthylamine, phenylbutylamine, 4,4'-(α,α-dimethylbenzyl)diphenylamine, N,N'-di-2-naphthyl-p-phenylenediamine; phenolic stabilizers, such as 2,6-di-t-butyl-4-methylphenol, tetrakis[methylene-3-(3,5-di-t-butyl-4-hydroxyphenyl)propionate]methane; thioether stabilizers, such as bis[2-methyl-4-(3-n-alkylthiopropionyloxy)-5-t-butylphenyl]sulfide; benzimidazole stabilizers, such as 2-mercaptobenzimidazole; dithiocarbamate stabilizers, such as nickel dibutyldithiocarbamate; and quinoline stabilizers, such as 2,2,4-trimethyl-1,2-dihydroquinoline polymer. These stabilizers may be used alone or in any combinations of two or more thereof. Generally, these anti-aging agent(s) may be used in an amount of 5 parts by weight or less, preferably 3 parts by weight or less, based on 100 parts by weight of the total ethylene-α-olefin-non-conjugated polyene copolymer rubber.

The processing aids may be any of those conventionally used to process rubbers and include higher fatty acids, such as linoleic, ricinolic, stearic, palmitic and lauric acids; salts of these higher fatty acids, such as barium, zinc and calcium stearates; or esters of these higher fatty acids. Generally, these processing aid(s) may be used in an amount of 10 parts by weight or less, preferably 5 parts by weight or less, based on 100 parts by weight of the total ethylene-α-olefin-non-conjugated polyene copolymer rubber.

The curing agents include sulfur, sulfur compounds and organic peroxides, although sulfur or sulfur compounds are particularly preferred.

Sulfur may be powdery sulfur, precipitated sulfur, colloidal sulfur, surface treated sulfur and insoluble sulfur.

Sulfur compounds may include sulfur chloride, sulfur dichloride, high molecular weight polysulfides, and sulfur compounds releasing active sulfur at curing temperatures to effect curing, such as morpholine disulfide, alkylphenol disulfide, tetramethylthiuram disulfide, dipentamethyl-enethiuram tetrasulfide, selenium dimethyldithiocarbamate. Sulfur is preferred.

Generally, sulfur or sulfur compounds) may be used in an amount of 0.1 to 10 parts by weight, preferably 0.5 to 5 parts by weight, based on 100 parts by weight of the total ethylene-α-olefin-non-conjugated polyene copolymer rubber.

When sulfur or sulfur compound(s) is used as a curing agent, it is preferred to use a curing promoter as well. The curing promoter may include sulfenamide compounds, such as N-cyclohexyl 2-benzothiazolesulfenamide (CBS), N-oxydiethylene-2-benzothiazolesulfenamide (OBS), N-t-butyl-2-benzothiazolesulfenamide (BBS), N,N-diisopropyl-2-benzothiazolesulfenamide; thiazole compounds, such as 2-mercaptobenzothiazole (MBT), 2-(2,4-dinitrophenyl) mercaptobenzothiazole, 2-(4-morpholinodithio) benzothiazole, 2-(2,6-diethyl-4-morpholinothio) benzothiazole, dibenzothiazyl disulfide; guanidine compounds, such as diphenylguanidine (DPG), triphenylguanidine, diorthotolylguanidine (DOTG), diorthonitrileguanidine, orthonitrilebiguanide, diphenylguanidine phthalate; aldehyde-amine or aldehyde-ammonia compounds, such as acetaldehyde-aniline condensate, butylaldehyde-aniline condensate, hexamethylenetetramine (H), acetaldehyde ammonia; imidazoline compounds, such as 2-mercaptoimidazoline; thiourea compounds, such as thiocarbanilide, diethylthiourea, dibutylthiourea, trimethylthiourea, diorthotolylthiourea; thiuram compounds, such as tetramethylthiuram monosulfide (TMTM), tetramethylthiuram disulfide (TMTD), tetraethylthiuram disulfide, tetrabutylthiuram disulfide, pentamethylenethiuram tetrasulfide; dithiocarbamates, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium dimethyldithiocarbamate; xanthogenates, such as zinc dibutylxanthogenate; and zinc white (zinc oxide). Generally, the curing promoter(s) may be used in an amount of 0.1 to 20 parts by weight, preferably 0.2 to 10 parts by weight, based on 100 parts by weight of the total ethylene-α-olefin-non-conjugated polyene copolymer rubber.

The organic peroxides are not particularly limited but may be any of those conventionally used for peroxide vulcanization of rubber. For example, included are dialkyl peroxides, such as dicumyl peroxide, t-butyl cumyl peroxide, di-t-butyl peroxide, di-t-amyl peroxide, di-t-butylperoxy-3,3,5-trimethylcyclohexane, t-butyl hydroperoxide, benzoyl peroxide, 2,5-dimethyl-2,5-di(t-butylperoxy)hexane, 2,5-dimethyl-2,5-di(t-butylperoxy)hexyne-3, 2,5-dimethyl-2,5-di(benzoylperoxy)hexane, 1,3-bis(t-butylperoxyisopropyl)benzene; peroxy esters, such as t-butyl peroxyacetate, t-butyl peroxyisobutyrate, t-butyl peroxypivalate, t-butyl peroxymaleate, t-butyl peroxyneodecanoate, t-butyl peroxybenzoate, di-t-butyl peroxyphthalate; ketone peroxides, such as dicyclohexanone peroxide; and mixtures thereof.

Preferably, organic peroxides providing a half life of one minute at a temperature in the range of 130 to 200° C. are used. In particular, those organic peroxides, such as dicumyl peroxide, di-t-butyl peroxide, di-t-butylperoxy-3,3,5-trimethylcyclohexane, t-butyl cumyl peroxide, di-t-amyl peroxide, and t-butyl hydroperoxide, are preferably used.

Generally, the organic peroxide(s) may be used in an amount of 0.0003 to 0.05 mole, preferably 0.001 to 0.03 mole, based on 100 g of the total ethylene-α-olefin-non-conjugated polyene copolymer rubber, although it is desirable to determine an optimum amount depending upon physical properties to be desired.

When the organic peroxide is used as a curing agent, it is preferable to use a curing aid as well. The curing aid may include quinone dioxime compounds, such as p-quinone dioxime; methacrylate compounds, such as ethylene glycol dimethacrylate, polyethylene glycol dimethacrylate, trimethylolpropane trimethacrylate; allyl compounds, such as diallyl phthalate, triallyl cyanurate, triallyl isocyanurate; maleimide compounds; and divinylbenzene. Generally, the curing aid(s) may be used in an amount of 0.5 to 2 moles, preferably in an approximately equimolar amount, per mole of the organic peroxide used.

The foaming agents may include inorganic, nitroso, azo, sulfonylhydrazide, and azide foaming agents. These foaming agents may be used alone or in any combinations of two or more thereof.

Illustrative examples of the foaming agents include inorganic foaming agents, such as sodium hydrogencarbonate (sodium bicarbonate), sodium carbonate, ammonium bicarbonate, ammonium carbonate, ammonium nitrite; nitroso foaming agents, such as N,N'-dinitrosopentamethylenetetramine (DPT), N,N'-dimethyl-N,N'-dinitrosoterephthalamide; azo foaming agents, such as azodicarbonamide (ADCA), azobisisobutyronitrile (AZBN), azobiscyclohexylnitrile, azodiaminobenzene, barium azodicarboxylate; sulfonylhydrazide foaming agents, such as benzenesulfonylhydrazide (BSH), p,p'-oxybis(benzenesulfonylhydrazide) (OBSH), toluenesulfonylhydrazide (TSH), diphenylsulfone-3,3'-disulfonylhydrazide; azide foaming agents, such as calcium azide, 4,4'-diphenyldisulfonyl azide, p-toluenesulfonyl azide. In particular, the sulfonylhydrazide and azo foaming agents are preferably used.

Generally, the foaming agent(s) may be used in an amount of 0.5 to 30 parts by weight, preferably 1 to 20 parts by weight, based on 100 parts by weight of the total ethylene-α-olefin-non-conjugated polyene copolymer rubber. From those rubber compositions containing the foaming agent in such an amount, it is possible to produce foamed products having an apparent specific gravity of 0.03 to 0.8 g/cm$^3$.

If necessary, a foaming aid may be used together with the foaming agent. The combined use of foaming agent and aid may advantageously reduce the decomposition temperature of the foaming agent, promote the decomposition and uniform foams. The foaming aids include organic acids, such as salicylic, phthalic, stearic and oxalic acids; urea and derivatives thereof. Generally, the foaming aid(s) may be used in an amount of 0.01 to 10 parts by weight, preferably 0.1 to 5 parts by weight, based on 100 parts by weight of the total ethylene-α-olefin-non-conjugated polyene copolymer rubber.

Since upon vulcanization of compounded rubbers, water included therein may form bubbles or provide different foaming rates, calcium oxide or the like may be added as a defoaming agent. Generally, the defoaming agent(s) may be used in an amount of 20 parts by weight or less, preferably 10 parts by weight or less, based on 100 parts by weight of the total ethylene-α-olefin-non-conjugated polyene copolymer rubber.

For example, the vulcanizable or curable rubber composition (compounded rubber) used in the present invention may be prepared in the following manner:

Thus, the ethylene-α-olefin-non-conjugated polyene copolymer rubber and optionally additives, such as rubber reinforcing agent(s), filler(s) and softening agent(s), is/are kneaded in an internal mixer, such as Bumbury's mixer, kneader or intermix, at a temperature of 80 to 170° C. for 3 to 10 minutes. Then, a curing agent and optionally a curing promoter or aid and a foaming agent is/are added and mixed in a roller, such as an open roller, or a kneader and kneaded for 5 to 30 minutes at a roller temperature of 40 to 80° C. Thus, the material may be extruded to an uncured rubber composition in the form of a ribbon or sheet.

When the kneading temperature in the internal mixer is low, a curing agent and promoter, a foaming agent and others may be simultaneously kneaded together with the ethylene-α-olefin-non-a conjugated polyene copolymer rubber, filler and softening agent.

The fourth invention is a molded rubber part for sealing comprising a vulcanized or cured product of the ethylene-α-olefin-non-conjugated polyene copolymer rubber according to the first or second invention. Further, the fifth invention is a molded rubber part for sealing comprising a vulcanized or cured rubber composition for sealing of the third invention.

The cross-linked, molded rubber part for sealing according to the present invention may be prepared by molding the vulcanizable compounded rubber prepared by the aforementioned method into a desired shape followed by vulcanization.

The method for vulcanization may be either heating in the presence of a curing agent or irradiation of electron beam.

Thus, the cross-linked, molded rubber part for sealing of the present invention may be prepared by molding the vulcanizable (uncured) compounded rubber prepared by the aforementioned method in a molding machine, such as an extruder, calender roll, press, injection molding machine or transfer molding machine, to a desired shape and, simultaneously or after introducing the resulting molded product into a curing vessel, heating at 120 to 270° C. for 1 to 30 minutes or irradiating electron beam to cure.

The curing step may be carried out with or without the use of a mold. When no mold is used, the steps of molding and curing are generally carried out continuously. The heating in the curing vessel may be effected by any means such as hot air, glass bead fluidized bed, UHF (ultrahigh frequency electromagnetic wave) or steam.

When an electron beam is used to cure in the absence of curing agent, generally, an electron beam having an energy of 0.1 to 10 MeV, preferably 0.3 to 2 MeV is irradiated to the uncured compounded rubber molded into a desired shape at an absorption dose of 0.5 to 35 Mrad, preferably 0.5 to 10 Mrad.

This specification includes part or all of the contents as disclosed in the specification of Japanese Patent Application No. 11-96475, which is a priority document of the present application.

BEST MODE FOR CARRYING OUT THE INVENTION

The present invention will be further illustrated by the following examples but it is not intended to limit the present invention thereto.

PREPARATION EXAMPLE (1) Preliminary Contact of Zirconium Compound and Methyl Alumoxane and Preparation of Catalytic Solution A predetermined amount of a zirconium compound (rac-dimethylsilylene-bis(2-methyl-4-phenyl-1-indenyl) zirconium dichloride) and a solution of methyl alumoxane in toluene (1.2 milligram atom/ml as reduced to aluminum atom) were mixed by stirring in dark at room temperature for 30 minutes to prepare a toluene solution in which the zirconium compound and methyl alumoxane were dissolved. The toluene solution had a Zr concentration of 0.002 mmoles/ml and a methyl alumoxane concentration of 1.2 milligram atom/ml as reduced to aluminum atom.

Then, to this toluene solution, 5 volumes of hexane relative to toluene was added under stirring to prepare a catalytic solution having the following Zr concentration and methyl alumoxane concentration, which was used as a catalyst for polymerization reaction:

Zr concentration: 0.00033 mmole/ml (=0.33 mmole/liter);

Methyl alumoxane concentration (as reduced to aluminum atom): 0.20 mmole/ml (=200 mmole/liter).

(2) Polymerization

Using a 15 liter stainless polymerization vessel equipped with a stirring blade, copolymerization of ethylene, propylene and 5-ethylidene-2-norbornene (hereinafter referred also to "ENB") was continuously effected in the presence of the polymerization catalyst of (1) above.

Thus, into the polymerization vessel, 3.17 liters per hour of dehydrated and purified hexane, 0.03 liter per hour of the mixed solution of the aforementioned zirconium compound and methyl alumoxane, 1.5 liters per hour of a solution of triisobutylaluminum in hexane (concentration of 17 mmole/liter) and 1.5 liters per hour of a solution of ENB in hexane (concentration of 0.02 liter/liter) were continuously supplied through the top of the polymerization vessel.

Further, 170 liters per hour of ethylene and 170 liters per hour of propylene were continuously supplied into the polymerization vessel through the top thereof. This polymerization reaction was effected at 70° C. with an average residence time of one hour (i.e., polymerization scale of 5 liters).

The polymerization mixture was extracted from the bottom of the polymerization vessel and a small amount of methanol was added to stop the polymerization reaction. The mixture was then subjected to steam stripping to separate the copolymer from the solvent, which was then dried under a reduced pressure (100 mmHg) at 100° C. for 24 hours.

In the above procedures, ethylene-propylene-ENB copolymer rubber (Copolymer Rubber: Component A in Examples 1 and 3) was obtained at a yield of 78 g per hour. The resulting Copolymer Rubber had the following properties:

(i) Molar ratio of units derived from ethylene to units derived from propylene (ethylene/propylene): 62/38;

(ii) Iodine value: 30 (g iodine/100 g polymer);

(iii) Intrinsic viscosity [η] as measured in decalin solvent at 135° C.: 1.6 dl/g;

(iv) gη$^{\ast}$ value: 0.90;

(v) Mw/Mn: 2.2;

(vi) Mz/Mw: 2.1;

(vii) Intensity ratio D (Tαβ/Tαα) of Tαβ to Tαα in $^{13}$C-NMR spectrum: <0.01;

(viii) B value: 1.1.

Ethylene-α-olefin-ENB copolymer rubbers (Components A in Examples 2, 4 and 5, and Components B in Examples 1 to 5 and Comparative Example 1) were prepared in the above-described procedures except that conditions for the copolymerization reaction were changed.

The results are shown in Table 1 below.

Further, Components A and B were blended at a weight ratio of copolymers of 60/40 to prepare mixtures of Examples 1 to 5 as set forth in Table 1 below.

Examples 1 to 5 and Comparative Example 1

Copolymer Rubbers as shown in Table 1 were used at amounts as shown in Table 2 to prepare compounded rubbers (Rubber Compositions).

Thus, the copolymer rubber and other ingredients were kneaded in a Bumbury's mixer (Kobe Steel, Ltd.) of 2.95 liters in volume for 10 minutes. The resulting compound was evaluated for rolling processability in the following manner.
(Evaluation Method)

The compound was wound on a front roll of a 14 inch open roll (temperature of front/back roll=65/50° C.; circumferential speed of front/back roll=13/11.5 rpm; roll gap: 5 mm).

Criteria for Evaluation:

Excellent: Compound is firmly wound on the roll;

Good: Compound is slightly peeled off by a roll guide;

Fair: Compound is peeled off from the roll at the top thereof but can be processed;

Fail: Compound is bagged and peeled off from the roll.

Then, a curing agent, curing promoter, foaming agent and other ingredients were added and kneaded to yield a rubber compound, which was then molded into a tube in a 60 mmφ extruder equipped with a tubular dice (12 m in inner diameter and 1.5 mm in thickness) at a dice temperature of 80° C. and a cylinder temperature of 60° C. The molded part was cured in a hot air curing vessel at 230° C. for 6 minutes to yield a sponge rubber.

The specific gravity, tensile stress at break (TB), tensile elongation at break (EB), compression set and shape retention of the resulting sponge rubber were determined according to the following methods.
(Measurement Methods)
(1) Specific Gravity A 20 mm×20 mm specimen was die cut from the top of the cured tubular sponge and the surface thereof was wiped to clean with alcohol. The specimen was fitted on an automatic gravimeter (Toyo Seiki Seisakusho K.K.: Model M-1) at 25° C. and the specific gravity was determined from the difference in mass between in air and in pure water.

(2) Tensile Stress at Break (TB) and Tensile Elongation at Break (EB)

The tensile stress at break (TB) and tensile elongation at break (EB) were determined according to JIS K6301.

(3) Compression Set (CS)

The tubular sponge rubber obtained above was cut into 30 mm in length and placed in a mold for measuring a compression set of a sponge rubber. The sponge rubber was compressed by 50% in the height and diameter and both the sponge and the mold were heat treated in a gear oven at 70° C. for 100 hours. Thus, the compression set (CS) was determined according to the physical test method for expanded rubber (SRIS-0101).

(4) Shape Retention

The shape retention was a ratio of height to width of the cross section of the cured tubular sponge.

Shape Retention (%)=(L/D)×100

L: Height of tubular sponge;

D: Width of tubular sponge.

The results are shown in Table 3 below.

TABLE 1

|  | Example | | | | | Comp. Ex. |
| --- | --- | --- | --- | --- | --- | --- |
|  | 1 | 2 | 3 | 4 | 5 | 1 |
| Component A | | | | | | |
| α-olefin | Propylene | Butene-1 | Propylene | Butene-1 | Propylene | |
| Ethylene content (mol %) | 62 | 70 | 62 | 58 | 62 | |
| Polyene | ENB | ENB | ENB | ENB | ENB | |
| Iodine value (g/100 g) | 30 | 35 | 30 | 21 | 30 | |
| [η], dl/g | 1.6 | 0.8 | 1.6 | 1.1 | 1.8 | |
| gη* | 0.9 | 0.95 | 0.9 | 0.7 | 0.82 | |
| Mw/Mn | 2.2 | 2.1 | 2.3 | 2.2 | 2.3 | |
| Tαβ/Tαα | <0.01 | <0.01 | <0.01 | <0.01 | <0.01 | |
| B value | 1.1 | 1.1 | 1.1 | 1.0 | 1.1 | |
| Component B | | | | | | |
| α-olefin | Propylene | Propylene | 1-Octene | Propylene | Propylene | Propylene |
| Ethylene content (mol %) | 72 | 76 | 82 | 65 | 72 | 70 |
| Polyene | ENB | ENB | ENB | ENB | ENB | ENB |
| Iodine value (g/100 g) | 22 | 30 | 26 | 32 | 22 | 26 |
| [η], dl/g | 4.5 | 5.1 | 5.2 | 2.3 | 7.5 | 2.7 |
| gη* | 0.85 | 0.8 | 0.58 | 0.72 | 0.85 | 0.78 |
| Mw/Mn | 2.4 | 2.6 | 2.6 | 2.4 | 2.8 | 2.7 |
| Tαβ/Tαα | <0.01 | <0.01 | <0.01 | <0.01 | <0.01 | <0.01 |
| B value | 1.1 | 1.1 | 1.1 | 1.1 | 1.1 | 1.1 |
| Mixture | | | | | | |
| Component A/B | 60/40 | 60/40 | 60/40 | 30/70 | 85/15 | 0/100 |
| Iodine value (g/100 g) | 26 | 33 | 28 | 29 | 29 | 26 |
| [η], dl/g | 2.8 | 2.6 | 3 | 1.9 | 2.6 | 2.7 |
| gη* | 0.87 | 0.89 | 0.77 | 0.71 | 0.82 | 0.78 |
| Ethylene content (mol %) | 66 | 72 | 70 | 63 | 63 | 70 |
| Mw/Mn | 3.2 | 5.4 | 3.5 | 3.0 | 6.9 | 2.7 |
| Tαβ/Tαα | <0.01 | <0.01 | <0.01 | <0.01 | <0.01 | <0.01 |
| B value | 1.1 | 1.1 | 1.1 | 1.1 | 1.1 | 1.1 |

TABLE 2

| | Parts by weight |
| --- | --- |
| Ingredients Mixed in Bumbury's mixer | |
| Copolymer Rubber | 100 |
| Active zinc white, META Z102, Inoue Sekkai Kogyo K.K. | 5 |
| Stearic acid | 2 |
| Dimethyldistearylammonium chloride Arquad 2HT-F, Lion Akzo Co. Ltd. | 2 |
| SRF-H carbon black Asahi #50HG, Asahi Carbon K.K. | 90 |
| Paraffinic process oil Diana Process PS-430, Idemitsu Kosan Co. Ltd. | 70 |
| Ingredient Added to Roll | |
| 2-Mercaptobenzothiazole Sanceler M, Sanshin Chem. Ind. Co. Ltd. | 0.8 |
| 2-(4-Morpholinodithio)benzothiazole Nocceler MDB, Oouchi Shinko Kagaku Kogyo K.K. | 1.2 |
| Zinc dibutyldithiocarbamate Sanceler BZ, Sanshin Chem. Ind. Co. Ltd. | 2.0 |
| 2-Mercaptoimidazoline Sanceler 22-C, Sanshin Chem. Ind. Co. Ltd. | 1.0 |
| p,p'-Oxybis(benzenesulfonylhydrazide) NEOCELLBORN N1000SW, Eiwa Kasei Kogyo K.K. | 3.5 |
| Calcium oxide VESTA20, Inoue Sekkai Kogyo K.K. | 5.0 |

TABLE 3

|  | Example | | | | | Comp. Ex. |
| --- | --- | --- | --- | --- | --- | --- |
|  | 1 | 2 | 3 | 4 | 5 | 1 |
| Polymer properties | | | | | | |
| Iodine value (g/100 g) | 26 | 33 | 28 | 29 | 29 | 26 |
| [η], dl/g | 2.8 | 2.6 | 3 | 1.9 | 2.6 | 2.7 |
| gη* | 0.87 | 0.89 | 0.77 | 0.71 | 0.82 | 0.78 |
| Ethylene content (mol %) | 66 | 72 | 70 | 63 | 63 | 70 |
| Mw/Mn | 3.2 | 5.4 | 3.5 | 3.0 | 6.9 | 2.7 |
| Tαβ/Tαα | <0.01 | <0.01 | <0.01 | <0.01 | <0.01 | |
| B value | 1.1 | 1.1 | 1.1 | 1.1 | 1.1 | |
| Rolling processability | Good | Excellent | Excellent | Good | Excellent | Bad |
| Specific gravity of sponge rubber | 0.52 | 0.54 | 0.56 | 0.46 | 0.53 | 0.54 |
| Properties of sponge rubber | | | | | | |
| TB, MPa | 2.4 | 2.7 | 2.6 | 2.1 | 2.6 | 2.7 |
| EB, % | 290 | 260 | 270 | 280 | 270 | 280 |
| Compression set, % | 31 | 29 | 30 | 38 | 35 | 30 |
| Shape retention, % | 87 | 83 | 89 | 61 | 74 | 80 |

All the publications, patents and patent applications cited herein are incorporated herein by reference in their entirety.

INDUSTRIAL APPLICABILITY

According to the present invention, there can be provided a cross-linked, molded rubber part for sealing which is excellent in sealing performance as well as rolling processability, shape retention, mechanical strength characteristics, heat resistance, cold resistance and compression set resistance.

Accordingly, the cross-linked, molded rubber part for sealing of the present invention may preferably be used in such applications as automobile sealing components, including weather strip, door glass run channel and window frame, and sealing components for civil construction including building gasket and civil engineering sheet.

What is claimed is:

1. An ethylene-α-olefin-non-conjugated polyene copolymer rubber comprising ethylene, an α-olefin having 3 to 20 carbon atoms and a non-conjugated polyene, characterized in that:

(i) the intrinsic viscosity [η] as measured in decalin solvent at 135° C. is 1.5 to 5.0 dl/g;

(ii) the gη$^\ddagger$ or g' value is 0.6 to 0.9, wherein the gη$^\ddagger$ value is defined as a ratio of the intrinsic viscosity [η] as measured in (i) above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in (i) above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$');

(iii) the Mw/Mn is 3.0 to 50;

(iv) the iodine value is 10 to 40;

(v) the molar ratio of ethylene to the α-olefin having 3 to 20 carbon atoms is 40/60 to 95/5; and (vi) the intensity ratio D of Tαβ to Tαα in $^{13}$C-NMR spectrum (Tαβ/Tαα) is 0.5 or less.

2. The ethylene-α-olefin-non-conjugated polyene copolymer rubber according to claim 1, wherein the B value as determined by $^{13}$C-NMR spectrum and the following equation:

$$B\ \text{value} = [P_{OE}]/(2 \cdot [P_E] \cdot [P_o])$$

in which [P$_E$] is a molar fraction of the content of units (a) derived from ethylene in the random copolymer rubber, [P$_o$] is a molar fraction of the content of units (b) derived from the α-olefin in the random copolymer rubber, and [P$_{OE}$] is a rate of the number of α-olefin-ethylene chains relative to the number of total dyad chains in the random copolymer rubber is 1.0 to 1.5.

3. An ethylene-α-olefin-non-conjugated polyene copolymer rubber comprising ethylene, an α-olefin having 3 to 20 carbon atoms and a non-conjugated polyene, which comprises:

(A) an ethylene-α-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη$^\ddagger$ or g' value is 0.8 to 0.98, wherein the gη$^\ddagger$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'); and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη$^\ddagger$ or g' value is 0.4 to 0.9, wherein the gη$^\ddagger$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), said copolymer rubber (A) and said copolymer rubber (B) being present in a weight ratio of 75/25 to 5/95.

4. The ethylene-α-olefin-non-conjugated polyene copolymer rubber according to claim 3, wherein the intrinsic viscosity [η] as measured in decalin solvent at 135° C. is 1.5 to 5.0 dl/g, the iodine value is 10 to 40, and the gη$^\ddagger$ or g' value is 0.6 to 0.9, wherein the gη$^\ddagger$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$').

5. A rubber composition for sealing comprising an ethylene-α-olefin-non-conjugated polyene copolymer rubber according to any one of claims 1 to 4.

6. A molded rubber part for sealing comprising an ethylene-α-olefin-non-conjugated polyene copolymer rubber according to any one of claims 1 to 4, which has been cured.

7. A molded rubber part for sealing comprising a rubber composition for sealing according to claim 5, which has been cured.

8. A cross-linked, molded rubber part for sealing comprising a rubber composition of an ethylene-α-olefin-non-conjugated polyene copolymer rubber which comprises ethylene, an α-olefin having 3 to 20 carbon atoms and a non-conjugated polyene, said ethylene-α-olefin-non-conjugated polyene copolymer rubber being obtained by random copolymerizing, in the presence of a catalyst, ethylene, an α-olefin having 3 to 20 carbon atoms, and a non-conjugated polyene having only one carbon-carbon double bond polymerizable by said catalyst per molecule among carbon-carbon double bonds present therein, said ethylene-α-olefin-non-conjugated polyene copolymer rubber being a blend of (A) an ethylene-α-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη$^{\ddagger}$ or g' value is 0.8 to 0.98, wherein the gη$^{\ddagger}$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη$^{\ddagger}$ or g' value is 0.4 to 0.9, wherein the gη$^{\ddagger}$ value is defined as a ratio of the intrinsic viscosity [η] as measured in the above to an intrinsic viscosity [η] blank as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$'), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), said copolymer rubber (A) and said copolymer rubber (B) being present in a weight ratio of 75/25 to 5/95, and wherein, after blending, the intrinsic viscosity [η] as measured in decalin solvent at 135° C. is 1.5 to 5.0 dl/g, the iodine value is 10 to 40, and the gη$^{\ddagger}$ or g' value is 0.6 to 0.9, wherein the gη$^{\ddagger}$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$').

9. A process for preparing a molded rubber part for sealing, comprising curing a rubber composition comprising an ethylene-α-olefin-non-conjugated polyene copolymer rubber, said ethylene-α-olefin-non-conjugated polyene copolymer rubber being obtained by random copolymerizing, in the presence of a catalyst, ethylene, an α-olefin having 3 to 20 carbon atoms, and a non-conjugated polyene having only one carbon-carbon double bond polymerizable by said catalyst per molecule among carbon-carbon double bonds present therein, said ethylene-α-olefin-non-conjugated polyene copolymer rubber being a blend of (A) an ethylene-α-olefin-non-conjugated polyene copolymer rubber, wherein the molar ratio of ethylene to the α-olefin having 3 to 20 carbon atoms is 40/60 to 75/25; the intrinsic viscosity [η] as measured in decalin solvent at 135° C. is 0.5 to 2.0 dl/g; the iodine value is 15 to 50; and the gη$^{\ddagger}$ or g' value is 0.8 to 0.98, wherein the gη$^{\ddagger}$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), and (B) an ethylene-α-olefin-non-conjugated polyene copolymer rubber, wherein the molar ratio of ethylene to the α-olefin having 3 to 20 carbon atoms is 50/50 to 95/5; the intrinsic viscosity [η] as measured in decalin solvent at 135° C. is 3.0 to 10.0 dl/g; the iodine value is 5 to 35; and the gη$^{\ddagger}$ or g' value is 0.4 to 0.9, wherein the gη$^{\ddagger}$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer (g'=[η]/[η]$_{blank}$'), said copolymer rubber (A) and said copolymer rubber (B) being present in a weight ratio of 75/25 to 5/95, and wherein, after blending, the intrinsic viscosity [η] as measured in decalin solvent at 135° C. is 1.5 to 5.0 dl/g, the iodine value is 10 to 40, and the gη$^{\ddagger}$ or g' value is 0.6 to 0.9, wherein the gη$^{\ddagger}$ value is defined as a ratio of the intrinsic viscosity [η] as measured in the above to an intrinsic viscosity [η]$_{blank}$ as measured in decalin solvent at 135° C. of a linear ethylene-propylene copolymer having an ethylene content of 70% by mole which has the same weight average molecular weight (according to light scattering method) as the ethylene-α-olefin-non-conjugated polyene copolymer rubber having the intrinsic viscosity [η] ([η]/[η]$_{blank}$), and the g' value is defined as a ratio of the intrinsic viscosity [η] as measured in the above to an intrinsic viscosity [η]$_{blank}$' as reduced to a linear ethylene-propylene copolymer having an ethylene content of 70% by mole, which is determined by gel permeation chromatography (140° C., o-dichlorobenzene solvent) of the ethylene-α-olefin-non-conjugated polyene copolymer ($g'=[\eta]/[\eta]_{blank}'$).

* * * * *